United States Patent
Ma et al.

(10) Patent No.: US 11,150,180 B1
(45) Date of Patent: Oct. 19, 2021

(54) ACTUATED MULTI-CHAMBER CELLS FOR FLUID ANALYSIS

(71) Applicant: Redshift Bioanalytics, Inc., Burlington, MA (US)

(72) Inventors: Eugene Yi-Shan Ma, Newton, MA (US); Charles McAlister Marshall, North Andover, MA (US)

(73) Assignee: RedShift BioAnalytics Inc., Burlington, MA (US)

(*) Notice: Subject to any disclaimer, the term of this patent is extended or adjusted under 35 U.S.C. 154(b) by 0 days.

(21) Appl. No.: 16/248,045

(22) Filed: Jan. 15, 2019

Related U.S. Application Data

(60) Provisional application No. 62/617,843, filed on Jan. 16, 2018.

(51) Int. Cl.
*G01N 21/31* (2006.01)
*G01N 21/01* (2006.01)
*G01N 21/39* (2006.01)

(52) U.S. Cl.
CPC ............ *G01N 21/31* (2013.01); *G01N 21/01* (2013.01); *G01N 21/39* (2013.01); *G01N 2201/0446* (2013.01)

(58) Field of Classification Search
None
See application file for complete search history.

(56) References Cited

U.S. PATENT DOCUMENTS

| | | | |
|---|---|---|---|
| 6,531,044 B1* | 3/2003 | Anazawa | G01N 27/44721 204/452 |
| 8,018,593 B2* | 9/2011 | Tan | B01L 3/50273 356/344 |
| 9,377,400 B2 | 6/2016 | Wagner et al. | |
| 9,625,378 B2 | 4/2017 | Marshall et al. | |
| 9,778,167 B2 | 10/2017 | Wagner et al. | |
| 2004/0076319 A1* | 4/2004 | Fauver | G01N 21/4795 382/133 |
| 2013/0242307 A1* | 9/2013 | Hanashi | G01N 15/1463 356/425 |
| 2015/0276589 A1* | 10/2015 | Wagner | G01N 15/0205 356/440 |
| 2018/0059005 A1* | 3/2018 | Marshall | G01N 21/39 |

* cited by examiner

*Primary Examiner* — Michael P LaPage
(74) *Attorney, Agent, or Firm* — Nutter McClennen & Fish LLP

(57) ABSTRACT

A microfluidic analyzer includes optical sources and optical detectors, the sources generating optical beams, and a multi-chamber fluid cell mounted for relative movement of the fluid cell and the beams to selectively align fluid chambers with beam paths for obtaining optical-response measurements. The cell is configured to reduce differential optical-response measurement between fluid chambers not attributed to a differential analyte in chamber fluids. A controller (1) generates actuator control signals to produce the relative movement of the fluid cell and beams through a sequence of measurement positions, (2) for each measurement position, obtains a set of detector output values, and (3) applies processing to the detector output values to obtain differential optical-response measurements for characterizing a differential analyte between chamber fluids of the cell.

17 Claims, 13 Drawing Sheets

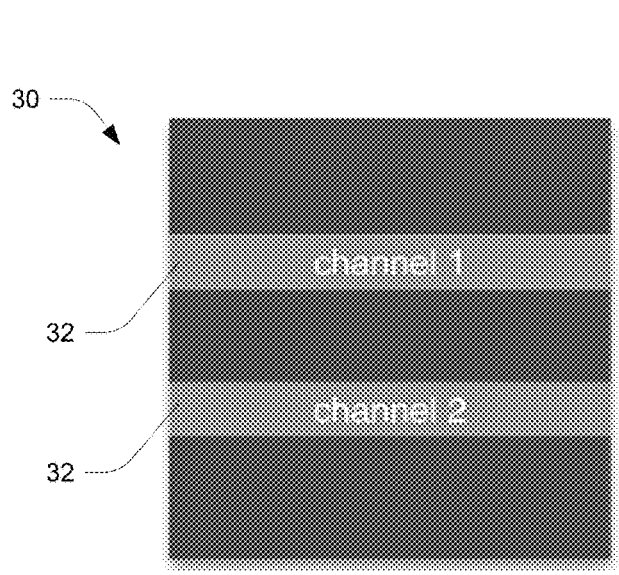
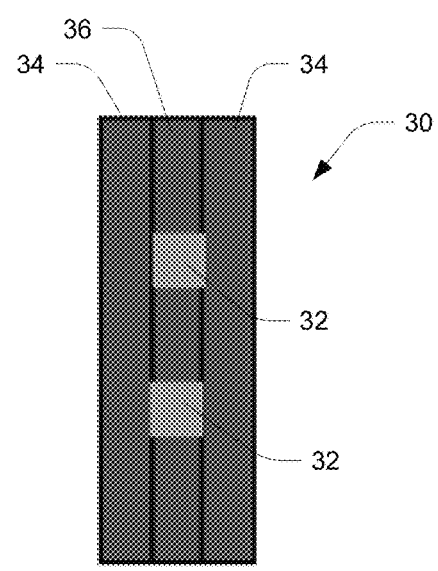
Fig. 2        Fig. 3
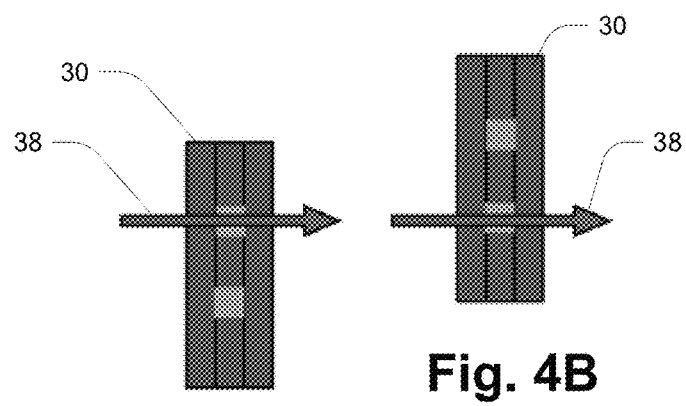
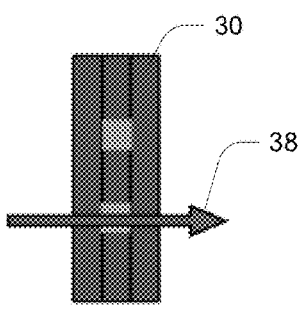
Fig. 4A        Fig. 4B
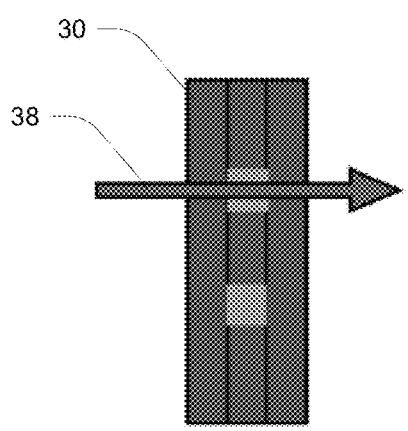
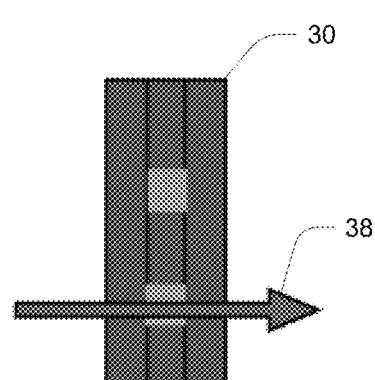
Fig. 5A        Fig. 5B

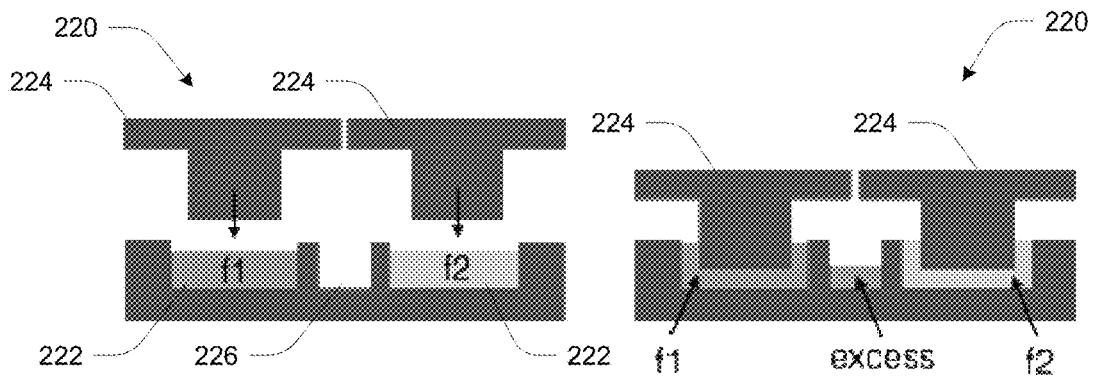
Fig. 30
Fig. 31
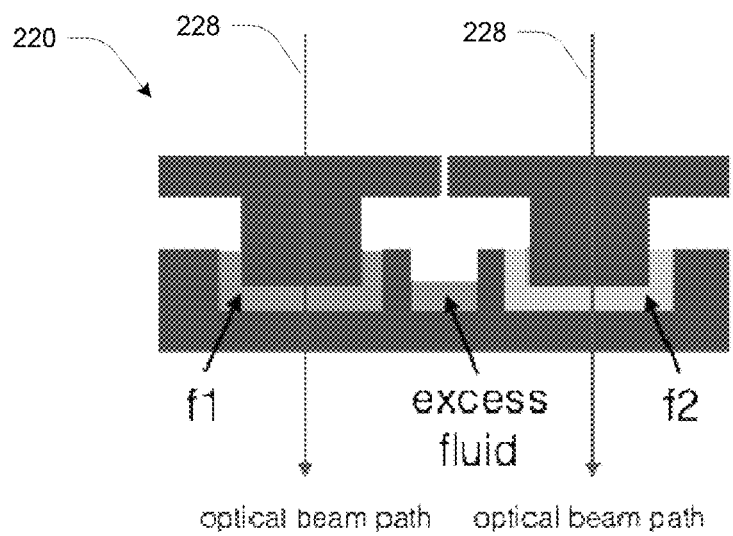
Fig. 32
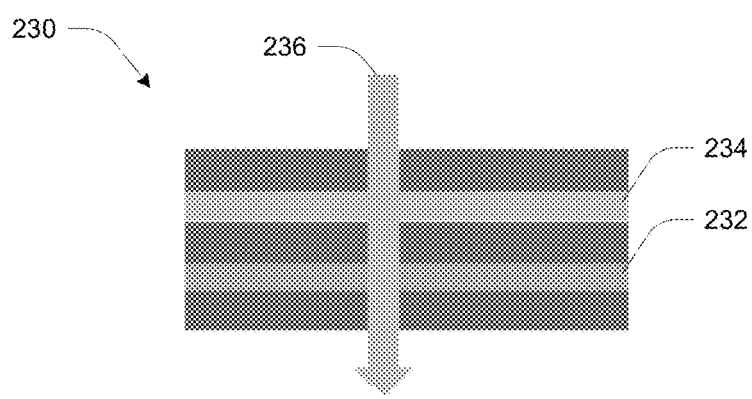
Fig. 33

ACTUATED MULTI-CHAMBER CELLS FOR FLUID ANALYSIS

BACKGROUND

The present disclosure relates to the field of spectroscopic fluid analyzers such as used in the characterization of proteins or other chemical/biological samples.

Microfluidic cells are typically used in spectroscopic measurement systems for containing the sample under test and associated reference materials. Flow-based techniques such as described in Wagner, U.S. Pat. No. 9,377,400, Motion Modulation Fluidic Analyzer System, which can provide high accuracy by presenting sample and reference fluids in a flow channel in nearly identical configurations for interrogation by an optical beam, reducing measurement errors based on differences of pressure, temperature, etc.

SUMMARY

One potential drawback of multi-use flow-based techniques is that they may require usage of a more sample than non-flow single-use techniques, and thus may less well suited for applications having very limited sample availability. The present disclosure describes novel cells and uses thereof that result in improved sample measurement performance of a fluid analyzer, which may also include designs and techniques of measurement that reduce sample volume and increase instrument operator efficiency. Although generally described with reference to non-flow-based operation, it will be appreciated that many of the concepts herein may nonetheless be applied to flow-based techniques or a combination of non-flow based and flow-based techniques, with corresponding advantages as will be apparent from this description.

Broadly, a microfluidic analyzer system uses a multi-chamber fluid cell, with commonalities across the chambers that provide for high-accuracy differential measurements by one or more optical interrogation beams of the analyzer. In one example, the cell is rotated to move chambers through interrogation region(s), and measurements are used in a way that reduces pathlength and other uncertainties. Alternatively, the cell may be moved in a raster or other fashion. More broadly, the cell and beam may move relative to each other to achieve a desired measurement of fluids within the cell. For example, the beam may move in a raster across a static cell. The analyzer may have one optical beam, so that all measurements have commonality of single optical channel. Alternatively, multiple beams may be used, providing higher throughput and removal of time-based variabilities from simultaneous measurements, with additional processing to reduce effects of using different beams.

More particularly, a microfluidic analyzer includes a set of optical sources and a set of optical detectors, the optical sources generating a set of optical beams, each optical beam defining a respective beam path along a beam axis. The analyzer also includes a multi-chamber fluid cell disposed on the beam axis between the optical sources and optical detectors, the fluid cell having fluid chambers containing fluids, the fluid cell being mounted for relative movement of the fluid cell and the optical beams to selectively align fluid chambers of the fluid cell with corresponding beam paths for obtaining optical-response measurements of fluids therein with reduction of a differential optical-response measurement between fluid chambers not attributed to a differential analyte in chamber fluids. An actuator is configured and operative to apply the relative movement of the fluid cell and optical beams in response to actuator control signals, and a controller is configured and operative (1) to generate the actuator control signals to produce the relative movement of the fluid cell and optical beams through a sequence of measurement positions in which corresponding fluid chambers of the fluid cell are aligned with corresponding beam paths, (2) for each measurement position, obtain a respective set of detector output values from the optical detectors, and (3) apply processing to the sets of detector output values for the sequence of measurement positions to obtain an analyte optical-response measurement for characterizing a differential analyte between chamber fluids of the fluid cell.

In some embodiments, the set of optical sources has exactly one optical source and the set of optical detectors has exactly one optical detector, the one optical source and one optical detector defining one beam path through which the fluid chambers are moved for obtaining the optical-response measurements, and the differential optical-response measurement results from a difference in pathlength in the beam path within the chambers fluids.

In some embodiments, the set of optical detectors has exactly one optical detector and the set of optical beams has two or more optical beams defining respective beam paths through which the fluid chambers are moved for obtaining the optical-response measurements, the beam paths extending through respective distinct fluid chambers of the fluid cell in each of the measurement positions.

In some embodiments, the optical beams are generated by a single optical source, the beams having substantially different power levels in respective fluid chambers, wherein a first beam power provides an improved differential optical-response measurement in a first set of fluid chambers relative to the differential optical-response measurement achievable with a second beam power, and the second beam power provides an improved differential optical-response measurement in a second set of fluid chambers relative the differential optical-response measurement achievable with the first beam power.

In some embodiments, the fluid chambers of the fluid cell are disposed in an arcuate fashion and the actuator is configured for rotational movement of the fluid cell through the sequence of measurement positions. The rotational movement may create spatial regions with different optical characteristics within the fluid chambers and the analyte optical-response measurement characterizes an analyte in a spatial region within a fluid chamber of the fluid cell. Additionally, the fluid cell may include rotation markers, the rotation markers configured and operative to position the cell relative to the actuator or track movement of the rotation markers during the rotational movement of the fluid cell to track rotational position. The optical beams or an imaging system may be configured and operative to track movement of the rotation markers during the rotational movement of the fluid cell to track rotational position.

In some embodiments, the fluid chambers of the fluid cell are disposed in a grid fashion and the actuator is configured for raster movement of the fluid cell through the sequence of measurement positions.

In some embodiments, the measurement positions are first measurement positions, and wherein the actuator and controller are co-configured and operative to also provide relative movement through second measurement positions in which the fluid chambers are not aligned with the beam paths to obtain corresponding dark offset measurements.

In some embodiments, the fluid cell includes alignment features, and further including an imaging system with an alignment reference indicating correct alignment of the fluid cell to the optical beam axis when the visible alignment features of the fluid cell are in registration with the alignment reference.

In some embodiments, the fluid cell includes integrated fluid reservoirs for accepting dispensed fluids of a first volume and providing a second smaller volume of the fluids to the respective chambers. An adapter may be mated to the fluid cell and configured to provide fluid channels for filling the reservoirs from one or more external sources.

In some embodiments, surfaces of a fluid chamber in the beam path are coated to reduce optical reflections in the chamber when containing fluids and increase optical reflections in the chamber when not containing fluids.

In some embodiments, the fluid cell is configured with multiple pathlengths per fluid chamber to provide for reducing pathlength differences in the optical-response measurements. Each fluid chamber may include a step-like transition in the fluid chamber to define the multiple pathlengths. Alternatively, the fluid cell includes top and bottom members configured for on-axis relative movement to provide the multiple pathlengths by position modulation.

In some embodiments, the fluid cell includes a bottom member and a top member, the bottom member defining respective wells for the fluid chambers, the top member defining respective pistons extending into the wells, the pistons displacing fluid from the fluid chambers during preparation of the fluid cell for use. The fluid cell may include one or more moats disposed between respective fluid chambers to receive overflow fluid displaced by the pistons during the preparation of the fluid cell for use.

In some embodiments, the fluid cell is a variable attenuator cell including a fluid attenuator channel along the beam axis, the fluid attenuator channel providing optical signal attenuation to match a receiving characteristic of the optical detectors.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 2 is a top view of a multi-chamber fluidic cell;

FIG. 3 is a side view of the cell of FIG. 2;

FIGS. 4A-4B are schematic views of operation in which a cell is moved across a stationary optical beam;

FIGS. 5A-5B are schematic views of operation in which an optical beam is moved across a stationary cell;

FIGS. 30-32 are side schematic views illustrating a cell employing wells and pistons to establish desired pathlength;

FIG. 33 is a side schematic view illustrating use of an attenuator fluid.

DETAILED DESCRIPTION

Figure 1:
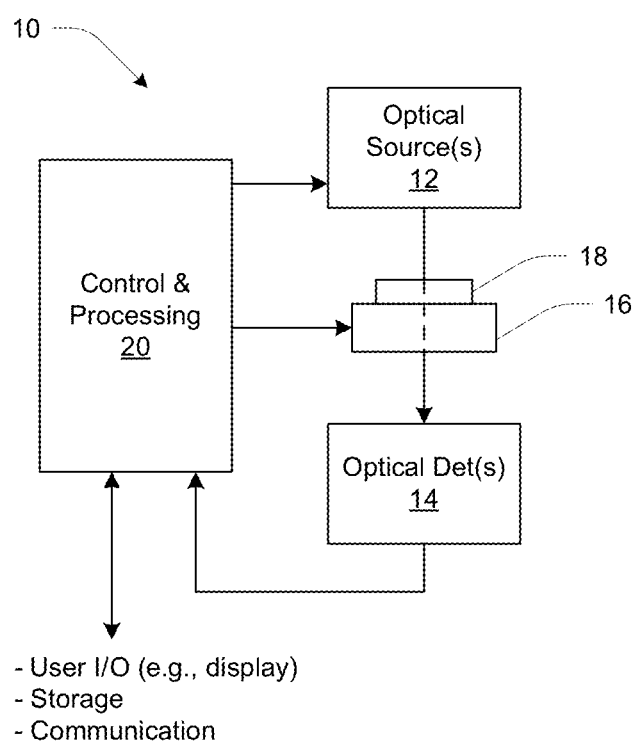
FIG. 1 is a block diagram of a microfluidic analyzer.

FIG. 1 shows a fluid analyzer 10 having one or more optical sources 12, one or more optical detectors (Det(s)) 14, an actuator 16 to which a sample cell 18 is mounted (or, in other embodiments, included in the optical source(s) 12), and control and processing circuitry 20, also referred to as a "controller" herein. As indicated, the control and processing circuitry 20 has external connections or interfaces to one or more of user input/output (I/O) devices (such as a display, key or touch input device, etc.), non-volatile storage (e.g., Flash memory, magnetic storage device, etc.), and/or communications links or networks (e.g., TCP/IP network, HTTP interface, etc.).

The fluid analyzer 10 is used to obtain measurements of optical properties of samples (e.g., biological samples such as proteins) that have been placed in respective chambers of the cell 18, as described more below. In operation, the optical sources 12 produce respective optical beams of desired wavelength and power, and these are directed through the chambers of the cell 18 toward respective detectors 14. The optical detectors 14 generate respective output signals indicating the strength of the optical signals incident thereon, which are provided to the control and processing circuitry 20. Using techniques generally known in the art, the control and processing circuitry 20 uses the values represented by the detector output signals to calculate corresponding optical properties of the samples, such as absorbance, and these optical properties are interpreted as functional indications about the samples (e.g., whether a sample contains a certain compound or detailed structure). These indications may be used in higher-level assessments according to the testing or research being conducted, again as generally known in the art. In the course of these operations, the control and processing circuitry 20 may transmit raw and/or processed test values to external devices/systems such as the user I/O devices, storage, communications etc.

This description uses the term "beam path" to describe the path of an optical beam from a source 12 to a detector 14, via the sample cell 18. FIG. 1 shows a transmissive configuration in which each beam path extends through the cell 18 from one side to the other. This configuration is generally assumed in the remaining description. However, an alternative system may employ a reflective configuration in which the beam paths are incident at one side of the cell 18 and are reflected thereby to detectors 14 arranged on the same side. As an example, the cell 18 may have a sandwich type of structure of glass, separator, glass. If both glasses are transmissive, then the overall cell 18 is transmissive. If the exit-side glass is reflective, then the cell 18 is reflective.

The following patents and applications provide context on optical measurement techniques of the general type described above.

| Juris-diction | App or Issue No. | Filing or Issue Date | Title |
|---|---|---|---|
| USA | 14/673,015 | Mar. 30, 2015 | Fluid Analyzer with Modulation for Liquids and Gases |
|  | 9,625,378 | Apr. 18, 2017 |  |
| USA | 14/693,301 | Apr. 22, 2015 | Motion Modulation Fluidic Analyzer System |
|  | 9,377,400 | Jun. 28, 2016 |  |
| USA | 15/175,709 | Jun. 7, 2016 | Motion Modulation Fluidic Analyzer System (1st Continuation) |
|  | 9,778,167 | Oct. 3, 2017 |  |
| USA | 15/605,962 | May 26, 2017 | Microfluidic Methods and Apparatus for Analysis of Analyte Bearing Fluids |

In one example, the optical sources 12 may be realized using one or more mid-IR lasers, such as fixed frequency or tunable QCL lasers. These are tuned to suitable wavelength(s) for measuring analyte(s) of interest, such as the peak of an absorbance feature chosen to minimize background interferences. The optical sources 12 may be coupled to the cell 18 through an optical fiber. Generally, measurements are differential in nature, i.e., based on differences in optical response of samples of interest and a reference. A reference may be chosen as a suitable blank, such as pure solvent, a gas, or other suitable reference material or mixture representative of sample background.

The system may employ one or multiple optical beams, as described more below. In one example, a dual beam configuration may include a chopper wheel on either side of the cell 18 which alternatively passes light to detectors 14 or blocks each of sample and reference beams, which may include blocking or passing of both beams simultaneously. The beams may be generated from a single laser source using a beam splitter and other optical components. Such a system enables measurement of fluids in a cell wherein the cell contains separated sample and reference fluids interrogated by the separate beams respectively.

In the measurement of fluids using spectroscopic techniques, minimizing the volume consumed in the measurement may be important, because of cost and/or limited availability of analytes of interest. Techniques that reduce the volume of fluid or quantity of analyte required for the measurement may therefore be advantageous. In many spectroscopic methods, the fluidic cell that contains the fluid under test, and the measurement technique associated with the cell, are important aspects of fluid and sample minimization. Spectroscopic methods typically perform a comparison of sample and background (reference) fluids, with the ratio of the two responses being referred to herein as differential absorbance or diffAU. In many applications, it is also preferred that disposable cells be used, which may be preferable for applications requiring thermal or chemical denaturing of proteins during the testing, for example.

The generalized analyzer 10 of FIG. 1 may employ one of several general techniques for obtaining measurements of samples, as follows:

Design 1: Moving two separated fluids (sample and reference) across a single static (not moving) optical beam Design 2: Moving a single optical beam across two separated fluids Design 3: Using multiple (e.g. two) static beams for interrogating multiple fluids simultaneously Other configurations, including combinations of the above, may be used. In some embodiments, sample volumes may be as small as 2 uL. Fluids can be delivered to cell chambers either directly (e.g., via pipette) or more indirectly, such as via fluid delivery channels and external pumps.

FIGS. 2 and 3 show an embodiment of a dual-sample cell 30 having two chambers 32, shown as channel 1 and channel 2. As seen in FIG. 3, it has a sandwich structure, with two outer glass plates 34 (when use herein, glass generally refers to materials that are substantively transparent at the wavelengths of the optical sources 12 unless otherwise stated) separated by a spacer 36, which may be a planar metal component for example. The channels 32 are formed as voids in the spacer 36, in the absence of a spacer 36, as voids in an outer glass plate 34. In use, a first fluid (sample) may be placed in channel 1, and second fluid (reference or buffer) may be placed in channel 2. Fluid connections may be provided from the edges or from the top or bottom surfaces through via holes. Typical channel geometries may be 10×2×0.025 mm (length×width×thickness/depth). One feature of this cell structure may be an ability to provide highly matched optical pathlengths for the two chambers 32 (e.g., to within approximately 1 um).

FIGS. 4A and 4B show an embodiment of the use of a dual channel cell such as the cell 30 of FIGS. 2-3, with the cell 30 being moved across a single static beam 38 for measurements of the fluids in the respective chambers 32. In FIG. 4A the cell 30 is positioned so the optical beam 38 passes through channel 1, and in FIG. 4B the cell 30 is positioned so the optical beam 38 passes through channel 2. Thus the cell 30 is translated across a fixed optical beam 38 such that in one position, the optical beam passes through channel 1, and the transmission through fluid 1 can be measured. The cell 30 is subsequently moved such that in a second position, the optical beam passes through channel 2, and the transmission through fluid 2 can be measured. The movement across the beam may be "stop-and-go" or "continuous". In "continuous" mode, the peak or average detector signal can be used to mitigate reproducibility concerns related to mechanical positioning. An advantage of the illustrated approach is that the optical path is unchanged except for the movement of the fluid and the optical chambers 32 containing the fluids. Higher analyte concentrations may be used to reduce the influence of measurement noise from the repeated cell movements.

FIGS. 5A and 5B show an embodiment of the dual-sample cell 30 in operation with a moving optical beam 38. In this scheme, the cell position does not change, and the optical beam 38 is moved between the two channels. This technique may require beam steering techniques and apparatus such as mechanically moving mirrors, for example, which may increase noise due to variability in the accuracy of position repeatability.

FIGS. 6-9 show different cell types that may be used with the designs as outlined above.

Figure 6:
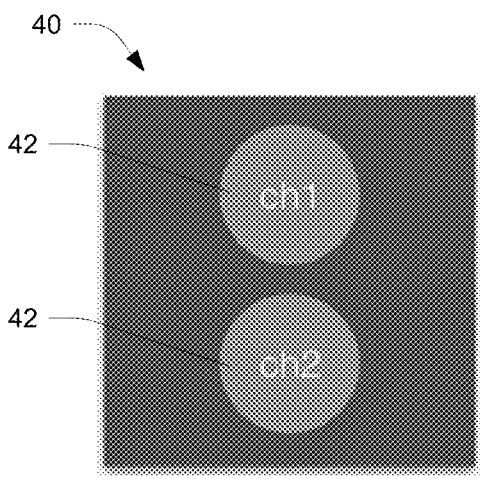
FIGS. 6-9 are top views of four cells having different chamber/channel configurations.

FIG. 6 shows a dual-chamber cell 40 having two well-like chambers 42 shown as channel 1 (ch1) and channel 2 (ch2) respectively. There are no fluid ports on the cell 40, thus fluid is dispensed directly onto open chambers 42 and the cell is then sealed prior to use in testing. The process for assembly may be automated for greater consistency and efficiency of operation. There may be a risk of trapping air unless allowance is made for spillover. To prevent spillage from one channel to the other or trapping of air, additional structures such as spillover trench(es) or moats may be used.

Figure 7:
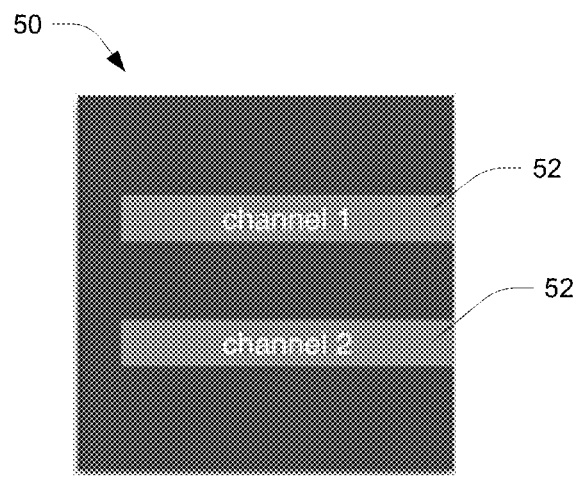

FIG. 7 shows a dual chamber, single edge cell 50 having two trough-like chambers 52 shown as channel 1 and channel 2. The chambers 52 are open at one end (toward right in FIG. 7) and closed at the other (toward left). Fluid is dispensed directly onto open cell, which may be later assembled/sealed; to avoid any trapping of air at the closed end, a droplet may be positioned there upon insertion. To prevent spillage from one channel to the other, additional structures such as spillover trench(es) or moats may be used.

Figure 8:
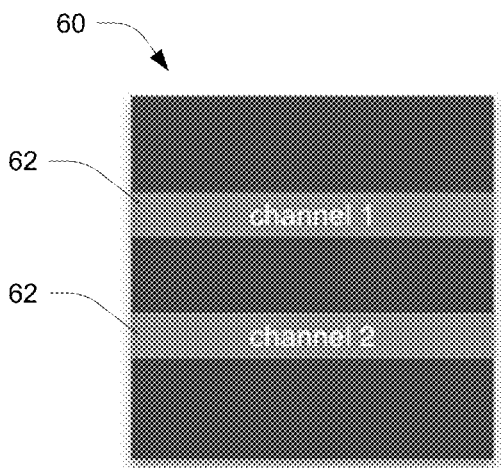
Figure 9:
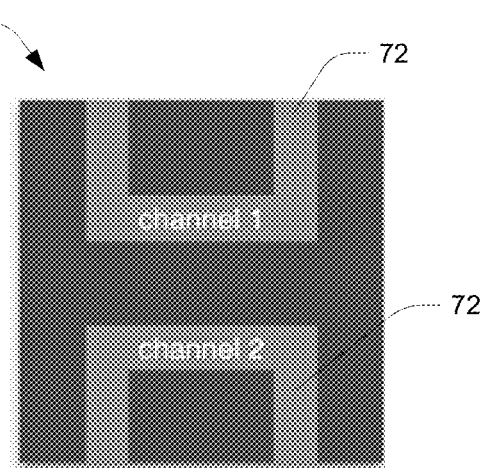
Figure 10A:
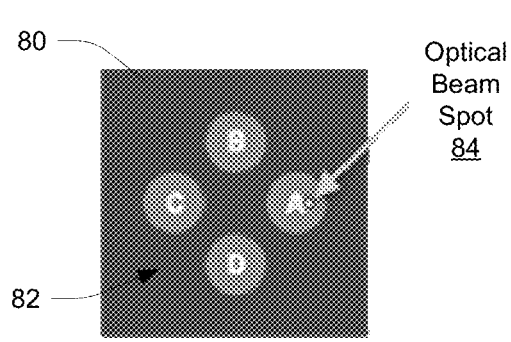
FIGS. 10A-10H are top views depicting rotation of a cell during a sequence of measurements with a single optical beam.
Figure 10B:
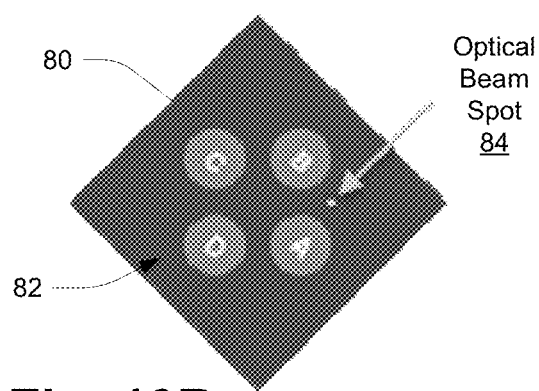
Figure 10C:
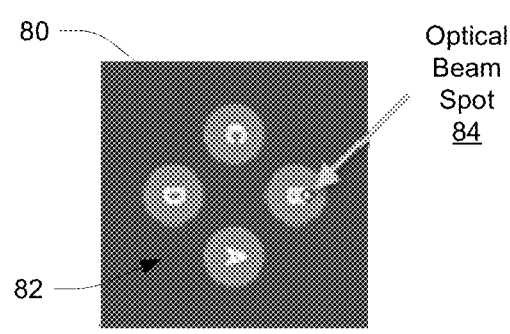
Figure 10D:
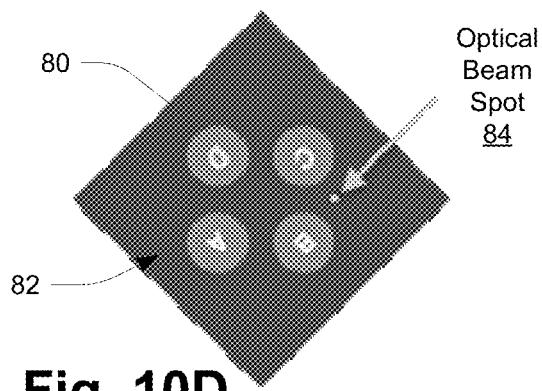
Figure 10E:
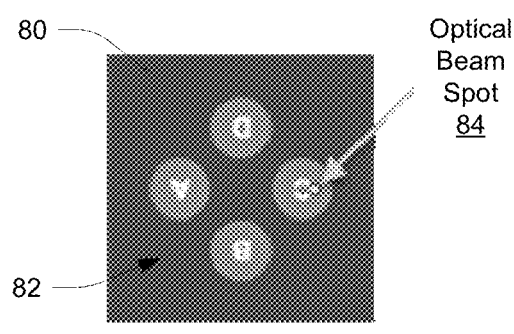
Figure 10F:
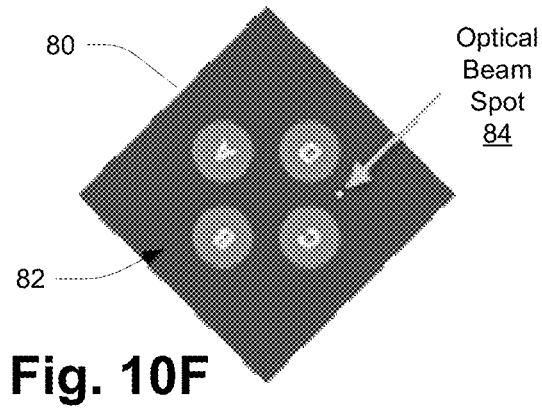
Figure 10G:
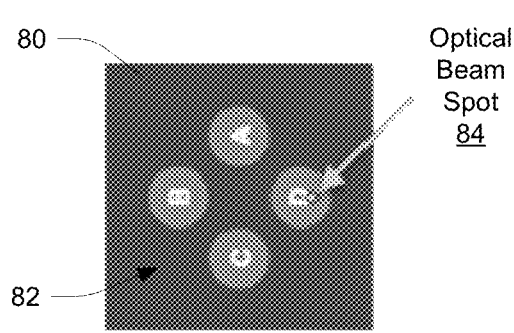
Figure 10H:
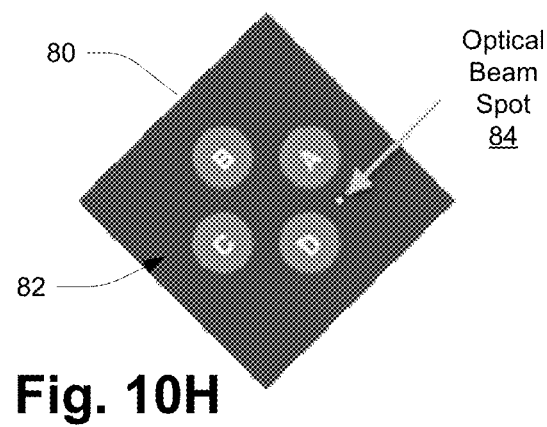
Figure 11A:
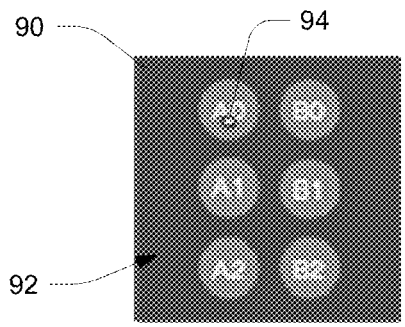
FIGS. 11A-11F are top views depicting raster or XY translation of a cell during a sequence of measurements with a single optical beam.
Figure 11B:
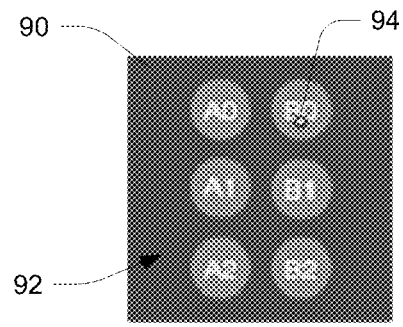
Figure 11C:
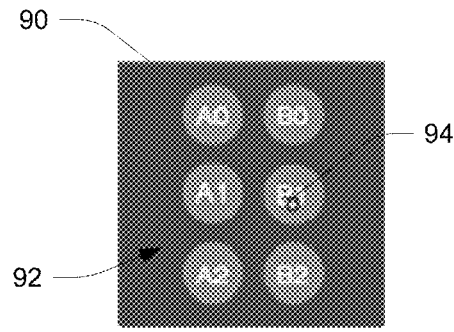
Figure 11D:
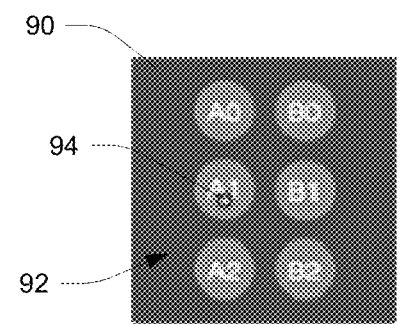
Figure 11E:
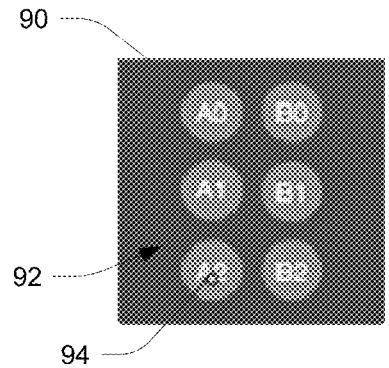
Figure 11F:
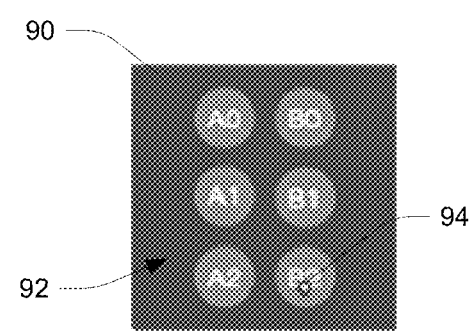
Figure 12A:
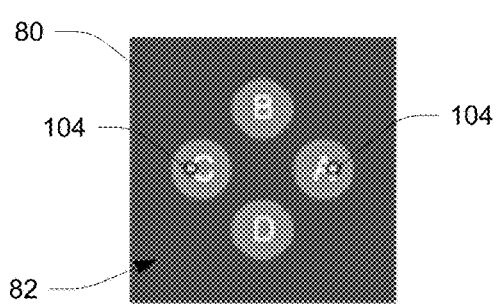
FIGS. 12A-12H are top views depicting rotation of a cell during a sequence of measurements with dual optical beams.
Figure 12B:
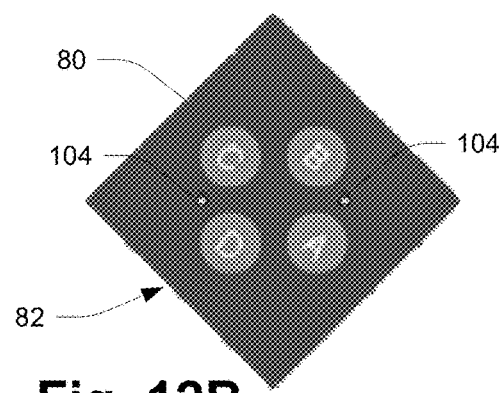
Figure 12C:
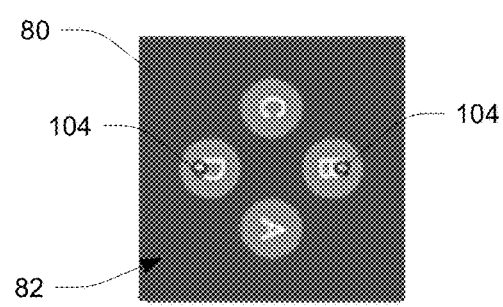
Figure 12D:
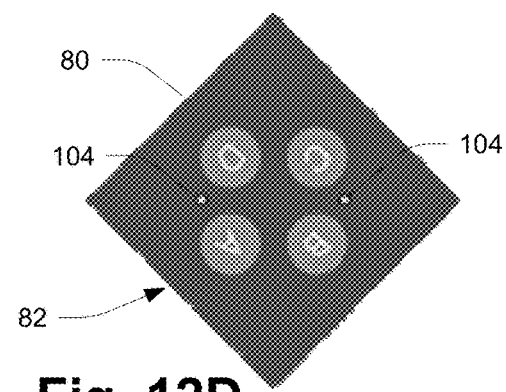
Figure 12E:
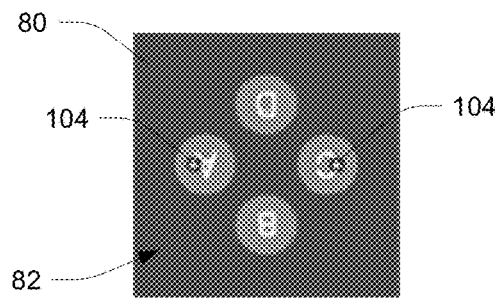
Figure 12F:
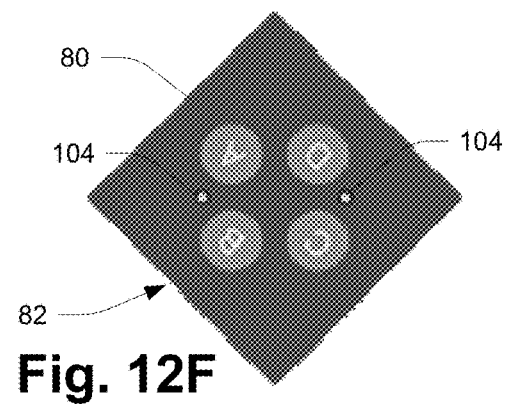
Figure 12G:
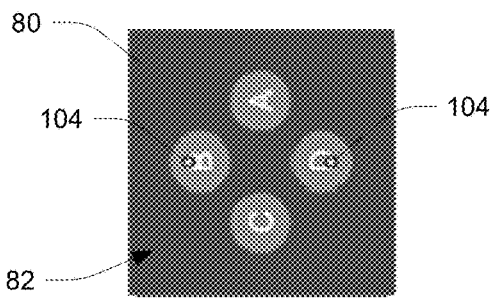
Figure 12H:
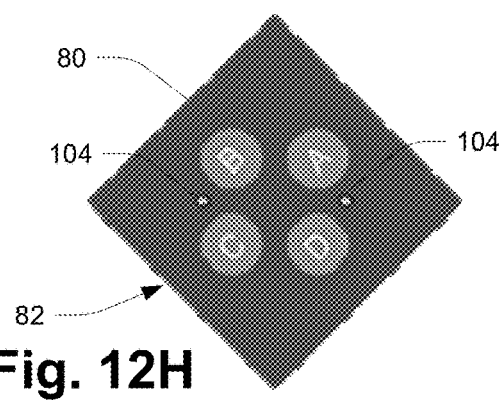

FIGS. 8 and 9 show two dual chamber cells 60, 70 whose respective chambers 62, 72 extend to respective cell edges. Excess fluid may be moved toward either end, reducing spillover crosstalk. If cross contamination at the ends is a concern, the configuration of FIG. 9 isolates each channel's ports at a respective side. Fluid may be dispensed directly or via fluid connectors and external fluid delivery apparatus, not shown. The use of fluid connectors eliminates fluid crosstalk risk. Dead volume and possible air bubbles may be introduced if fluid is delivered to cell from outside the cell. There is less concern if fluid is dispensed directly onto cell which is later assembled, pushing liquid and air outwards the edges.

In the embodiments of FIGS. 6-9, reduced cell size can be achieved by eliminating any need for via holes on the surface of the cell. Via holes are not used for closed cell designs (no fluid connections). Otherwise fluid connections made to the edge of the cell may be more cost-effective. For non-flow designs, no fluid back pressure means a smaller edge frame may be required for clamping, further reducing cell area, and no need for bonding the two surfaces of the cell is necessary. Also, when measuring fluids over a range of temperatures, a smaller cell can be heated more efficiently, especially in a non-flow scheme in which the fluid is not constantly being replaced. A heated fluid sample may undergo cumulative heating as is expected for thermal stress testing. Heaters may be integrated directly into the cell design (e.g. electrical contact pads and electrical resistive traces for Joule heating), or a thermally conductive cell (e.g. silicon) can be in direct thermal contact with a TEC/heater block.

The cells 40-70 may be formed in a variety of materials as known in the art, such as silicon fabricated using MEMS techniques or in a polymer using molds. Silicon has a relatively high thermal conductivity and can be used to reduce thermal gradients across areas of the cell which are designed for thermal equilibration.

FIGS. 10A-10H illustrate a first example measurement scheme employing a cell 80 similar to the cell 40 (FIG. 6), albeit with four chambers shown as A, B, C and D respectively. The analyzer has a single optical beam that travels in a direction orthogonal to the view of these Figures. The beam is represented by an optical beam spot 84, which is the location at which the beam is incident on the cell 80.

The cell 80 may be micromachined/diced dimensionally precise to <50 um. The four fluid regions or chambers 80 may be small, each roughly 2 mm in diameter for example, so there is sufficient tolerance for mechanical alignment when switching between different cells. For typical optical sensing pathlengths of 25 um, the volumes of each of the chambers 82 is <80 nL. This may be beneficial for applications like high-throughput screening (HTS) which may have a large number of samples and thus present a challenge in efficient use of limited sample material. The ability to perform structural characterization on a very small sample volume can be advantageous. In the embodiment of FIGS. 10A-10H, efficiency is promoted by a small size of the optical beam spot 84 and the nanoliter-sized chambers 82 in the cell 80.

The chambers 82 may be designed to have different optical pathlengths within the cell to accommodate fluids with varying absorption, reducing the need to adjust optical power. The chambers 82 may include pairs with the same pathlength within a pair and a varying pathlength between pairs. This enables fluids with lower absorption to have longer pathlengths, thereby improving signal to noise at the detector, since longer pathlengths provide more signal. The use of multiple pathlengths also enables a single laser electrical power level to be used, wherein the laser may have different optical power at different wavelengths due to the spectral shape the laser gain. In one system, the current provided to a laser chip used to generate the optical beam is constant at all wavelengths within a spectroscopic wavelength scan and the cell pair that provides the best signal-to-noise ratio (SNR) at each wavelength is selected for use in determining fluid properties. The use of neutral density filters to attenuate optical power, or the use of varying electrical current as a function of wavelength may by this technique be reduced or eliminated.

FIGS. 10A-10H illustrate a measurement scheme in which the cell 80 is rotated about its center to move successive areas including the chambers 82 to the location of the single optical beam spot 84, for obtaining corresponding optical response measurements. In this embodiment, it will be understood that the actuator 16 (FIG. 1) is configured for such mounting and rotation of the cell 80 in a plane transverse to that of the optical beam. The rotation may be continuous as in a rotating wheel or it may rotate and stop at each measurement point.

A rate of continuous rotation may be selected to achieve a desired signal to noise improvement when characterizing the fluids or it may be selected based on a consideration of centrifugal effects on the fluids. The signal to noise improvement may result from an increase in the differential signal generated by an analyte difference between fluids in two chambers 82, or a reduction in noise (i.e. uncertainty) arising from a source not attributed to an analyte difference between fluids in two chambers 82. The rate of rotation may be selected to generate a region within the chambers 82 to perform the optical measurement, as for example by using centrifugal forces to position (i.e. separate) particulates, precipitated materials or air bubbles in a region or regions of chamber 82. The material positioned may be the result of chemically or thermally induced changes to the chamber 82 fluids, such changes occurring either prior to or during use of the cell in the fluid analyzer. By way of example, the fluid cell may be heated by the fluid analyzer with the objective of measuring changes in fluid characteristics as a function of temperature, and participates may be generated during the heating of the fluid cell. The beam path may then be positioned sequentially in more than one region of chamber 82 to measure different characteristics of the content of chamber 82. Continuous and rotate-stop rotation may both be used, for example by using continuous rotation to achieve material separation within the fluid followed by rotate-stop characterization of the fluid within chamber 82. In either continuous or rotate stop, observation of the fluid may be performed in different time intervals to thereby observe the separation of materials if present, or the interdiffusion or redistribution of materials after separation.

Specifically, FIGS. 10A-10H show a sequence of eight distinct positions for corresponding measurements, described as respective Phases (1-8) below:

Phase 1 (FIG. 10A): the transmittance of the optical beam (which is at spectral position λ1) through region A is measured, as shown above. Region A may be the buffer, for example.

Phase 2 (FIG. 10B): the cell rotates 45° clockwise, as shown above. The optical beam position (as denoted by the red beam spot) does not move in the system itself. However, because of the rotation of the cell, the cell (which may be designed to be opaque) is now blocking the optical beam. This permits the measurement system ("analyzer") to obtain a "dark offset signal" for the optical detector. This dark offset signal can be removed from actual fluid measurement signals. Alternatively, a shutter may be used to block the optical beam from the detector, though this adds additional components and costs to the system. Because this dark offset signal may vary over time, it is advantageous to subtract this dark offset signal from the most recent measurement (Phase 1).

Phase 3 (FIG. 10C): the cell rotates an additional 45° (Δ90° cumulative), as shown above. The cell is now rotated such that the optical beam is passing through region B (e.g. sample).

Phase 4 (FIG. 10D): the cell rotates an additional 45° (Δ35° cumulative). Similar to phase 2, the cell (if opaque) blocks the beam and the analyzer can obtain a dark offset signal which can be subtracted from the most recent measurement (Phase 3).

Phase 5 (FIG. 10E): the cell rotates an additional 45° (Δ180° cumulative), as shown above. The cell is now rotated such that the optical beam is passing through region C (e.g. buffer).

Phase 6 (FIG. 10F): the cell rotates an additional 45° (Δ225° cumulative). Similar to phase 2, the cell (if opaque) blocks the beam and the analyzer can obtain a dark offset signal which can be subtracted from the most recent measurement (Phase 5).

Phase 7 (FIG. 10G): the cell rotates an additional 45° (Δ270° cumulative), as shown above. The cell is now rotated such that the optical beam is passing through region D (e.g. sample).

Phase 8 (FIG. 10H): the cell rotates an additional 45° (Δ315° cumulative). Similar to phase 2, the cell (if opaque) blocks the beam and the analyzer can obtain a dark offset signal which can be subtracted from the most recent measurement (Phase 7).

After the above complete 8-phase cycle, four fluid measurements and four dark offset measurements have been captured for wavelength λ1. One or more additional such sequences of measurements may be performed at λ1 and the results averaged with the first set, for noise reduction. Once the measurements for λ1 have been obtained, the source 12 may be tuned to a next spectral position (λ2) and the measurement cycle repeated. Such cycles can be repeated until all desired spectral positions are measured (λ1, λ2, . . . λn) forming a complete spectral profile that may be used in separate analysis.

Each of the dark offset measurements (FIGS. 10B, 10D, 10F, 10H) can be subtracted from their preceding fluid measurements (FIGS. 10A, 10C, 10E, 10G), for example. Alternatively, they may be subtracted from the measurement that follows (FIGS. 10C, 10E, 10G), or they may be averaged to yield a single dark offset signal that is subtracted from all fluid measurements. In this example, fluids are arranged as follows: A=buffer, B=sample, C=buffer, D=sample. Two differential absorbance measurements can be obtained, from B−A and D−C. Three translational offset measurements can be obtained, from A−C, B−D, and (B−A)+(C−D).

Note that the illustrated method may be unable to remove differences in pathlength between chambers 82 ("pathlength offset"). The pathlength offset may be reduced by micromachining parts of chambers 82 so the pathlength tolerance is very good between chambers 82, typically <1 um variation. The cell may include a chamber 82 containing a material with known characteristics, thereby enabling a determination of the nominal pathlength of all the chambers 82 in the cell. The cell and each chamber 82 may be pre-characterized in the manner described herein using a fluid with known characteristics (e.g. water), and the pre-characterized measurement of the pathlength of each chamber 82 may be used in subsequent characterization of fluids within the cell as described herein.

The cell 80 and fixture may rotate back in the opposite direction, or they may continue in the same direction if there are no fluidic or electrical connections that prevent it from doing do. Measurements may be taken while rotating in the opposite direction, and such measurements may provide additional information on translational offsets as well as sample-buffer differential absorbance measurements that may be coadded.

Additionally, different samples and buffers may be placed in the different chambers 82 on the same cell 80. For example, three concentrations or three replicates of the same analyte may be placed in the cell as follows: A=buffer, B=sample1, C=sample2, D=sample3. In this way, three differential absorbance measurements ("diffAU") are obtained: B−A, C−A, D−A. Translational offsets can be determined by comparing the diffAU from different directions.

In other systems where different samples are measured serially, one after another, the laser completes one spectral sweep for the first sample, and then performs another spectral sweep for the next sample. However, one of the challenges in any tunable laser system is the ability to repeatably lase at the same longitudinal mode positions for each sample being compared. Mode hops do occur, and when performing sensitive measurements, these mode hops can erroneously appear as a spectral feature in the sample. This corrupts the spectra and any spectral comparison made to it. Typically, then, all spectral data in the corrupted sample scan may be at reduced performance or may be discarded. Therefore, the ability to measure and compare multiple samples on the same cell while at the same laser spectral position is beneficial for these sample comparisons, because all sample spectra are captured at the same exact spectral positions.

An alternative approach employs a different number of chambers per cell. A system may use two fluid chambers instead of four. In this case, no buffer-buffer or sample-sample measurements are obtained. Translational offset measurements may be determined by comparing measurements in one rotational direction with the measurements taken in the opposite directions. Specifically, with only two regions (A=buffer, B=sample), then the differential absorbance obtained during clockwise rotation (B−A)$_{cw}$ should equal the differential absorbance in the counter-clockwise rotation, (B−A)$_{cc}$. Any differences are attributed primarily to mechanical/translational offsets since the cell pathlength is micromachined to sub-micron tolerances. Such a system may also employ three regions, for example with A=sample, B=buffer, C=buffer. Rotating through these regions can provide B−A (differential absorbance between sample and buffer) as well as (B–C) which is buffer-buffer to account for offsets while moving in the same rotational direction.

FIGS. 11A-11F illustrate an alternative scheme that employs cell configuration and movement according to a raster format in either a continuous or scan-stop motion, or arbitrary XY positioning sequence rather than through a set sequence as provided by cell rotation. Each chamber 92 of cell 90 is moved into the optical beam path (represented by optical beam spot 94) by the actuator 16 realized as an XY translational stage. This method may introduce additional alignment and translation complexity, i.e. two settings (X and Y) instead of one (angle). Nevertheless, a raster format may provide more flexibility in the number and locations of each chamber 92 in the multi-chamber cell design.

Using this scheme multiple samples with multiple buffers can be tested. Measurements can be taken as follows: A0→B0→A1→B1→A2→B2.

A0 (buffer0)–B0 (buffer0), which provides translational offset between Column A and Column B measurements.

A1 (sample1 in buffer2)–B1 (buffer1)
A2 (sample2 in buffer3)–B2 (buffer2)
. . .
$A_n$ (sample n in buffer n)–$B_n$ (buffer n)

If all samples share the same buffer, then fluids and measurements can be arranged as follows:

A0 (buffer))–B0 (buffer), which provides translational offset between Column A and Column B measurements.

Measurements can be taken as follows: A0→B0→A1→B1→A2→B2

A1 (sample1 in buffer)–B0 (buffer)
B1 (sample2 in buffer)–B0 (buffer)
A2 (sample3 in buffer)–B0 (buffer)
B2 (sample4 in buffer)–B0 (buffer)
. . . etc.

Fitting multiple fluid chambers on a common cell while minimizing cell size may yield more accurate measurements because measurements can be performed faster, with less mechanical translation and offset, and under common environmental conditions (e.g. temperature).

A cell with multiple fluid chambers may also be used in a multi-beam optical measurement system. Such a system may have the advantage of using a pyroelectric detector to cover a wider signal dynamic range without the need for discrete neutral density (ND) filters for reducing laser optical power to stay within the linear region of a detector (e.g. MCT), for example. It avoids the use of ND filters which can introduce unwanted etalon-induced signal variation due to surface parallelism of these discrete optics. For samples where the maximum incident optical power or power density may be limited by a combination of sample absorption (e.g. heating of the sample or optical modification of the sample) and optical design, additional sample beams enable increase sensitivity of measurement, nominally by the square root of the number of beams. Optical beams may also be at different optical power densities when incident on the cell, or at different wavelengths and generated by different optical sources, or different spot sizes. The beams may also be modulated, with the same or different modulation frequencies.

FIGS. 12A-12H illustrate a second example measurement scheme also employing the cell 80, used in an analyzer having two optical beams, the beams originating from one or more optical sources, for simultaneous measurements. The beams are represented by optical beam spots 104, which are the locations at which the beams (orthogonal to this view) are incident on the cell 80. The cell is placed in a fixture that allows for rotation about the cell center (for example). In an example usage, it is assumed that the chambers 82 are loaded as follows: A=sample, B=buffer, C=buffer, D=buffer.

FIGS. 12A-12H illustrate a sequence of eight distinct positions for corresponding measurements which are described as respective Phases (1-8) below:

Phase 1: the transmittance of the optical beam (which is at λ1) through regions A and C is shown above. A single detector or multiple detectors, once for each beam, may be used. A chopper may be used to let only one beam at a time through to a single detector, or the chambers may be located such that as the cell is moved, only a single beam is incident on a detector at any one position of the detector. If a chopper is used, a modulated signal (chopper rate) may be used to obtain a diffAU signal between region A (sample) and region C (buffer). Because the chopper rate may be high (e.g. >100 Hz), many coadds can be taken. In another embodiment, both optical beams may be incident simultaneously on a single detector for purposes of calibration. In another embodiment, the two beams may be modulated at different frequencies, the optical beams are simultaneously incident on a single detector, and signals from each optical beam separated using signal processing as known in the art.

Phase 2: the cell 80 rotates 45° clockwise. The optical beam positions (as denoted by the beam spots 104) do not move in the system itself. However, because of the rotation of the cell 80, the cell (which may be designed to be opaque) is now blocking the optical beams. This permits the measurement system ("analyzer") to obtain a "dark offset signal" for the detector which can be subtracted from the measurements captured in Phase 1.

Phase 3: the cell 80 rotates an additional 45° (Δ90° cumulative), as shown above. The cell is now rotated such that the optical beams are passing through regions B and D (e.g. buffer-buffer diffAU). This is an offset measurement between the two optical beam paths, which is critical in any dual beam system.

Phase 4: the cell 80 rotates an additional 45° (135° cumulative). Similar to phase 2, the cell (if opaque) blocks the beams and the analyzer can obtain a dark offset signal which can be subtracted from the most recent measurements (Phase 3).

Phase 5: the cell 80 rotates an additional 45° (Δ180° cumulative), as shown above. The cell is now rotated such that the optical beam is passing through regions C and A (e.g. buffer-sample). Data can be averaged with phase 1 measurements to remove bias between two beam paths.

Phase 6: the cell 80 rotates an additional 45° (Δ225° cumulative). Similar to phase 2, the cell (if opaque) blocks the beams and the analyzer can obtain a dark offset signal which can be subtracted from the most recent measurements (Phase 5).

Phase 7: the cell 80 rotates an additional 45° (Δ270° cumulative), as shown above. The cell is now rotated such that the optical beam is passing through region D and B (e.g. buffer-buffer). Like Phase 3, this is just an offset measurement between the two optical beam paths, which is critical in any dual beam system.

Phase 8: the cell 80 rotates an additional 45° (Δ315° cumulative). Similar to phase 2, the cell (if opaque) blocks the beams and the analyzer can obtain a dark offset signal which can be subtracted from the most recent measurements (Phase 7).

After the above 8-phase cycle, four fluid measurements and four dark offset measurements have been captured for wavelength λ1. If more coadds are desired, then the laser can remain at λ1 and one or more additional rotational cycles may be performed along with the corresponding measurements. Once all measurements for λ1 have been obtained, the laser may be tuned to a next spectral position (λ2) and the measurement cycle repeated. The sequence repeats until all desired spectral positions are measured (λ1, λ2, . . . λn) forming a complete spectral profile later to be used for analysis.

As in the scheme of FIGS. 10A-10H, each of the dark offset measurements can be subtracted from their preceding fluid measurements, for example. Alternatively, they may be subtracted from the measurement that follows, or they may be averaged to yield a single dark offset signal that is subtracted from all fluid measurements.

Based on an assumed configuration of A=sample, B=buffer, C=buffer, D=buffer, then after each 8-phase measurement cycle, two differential absorbance measurements can be obtained from A−B, B−A. Also, two beam-to-beam offset measurements can be obtained from B−D, D−B.

The cell 80 may be rotated back in the opposite direction, or it may continue in the same direction if there are no fluidic or electrical connections that prevent it from doing so. Measurements may be taken while rotating in the opposite direction, and these measurements provide additional information on offsets as well as sample-buffer differential absorbance measurements than may be coadded. As previously noted, the rotation may be rotate-stop or continuous rotation, and the detector signal acquisition and subsequent signal processing of signals may be performed as known in the art for either type of motion.

Figure 13A:
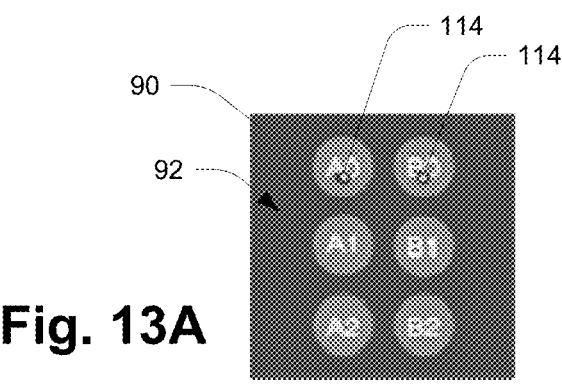
FIGS. 13A-13C are top views depicting raster or XY translation of a cell during a sequence of measurements with dual optical beams.
Figure 13B:
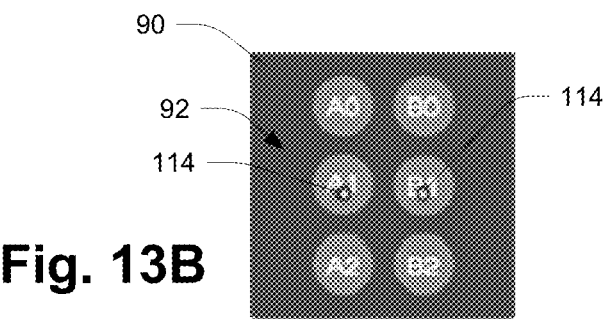
Figure 13C:
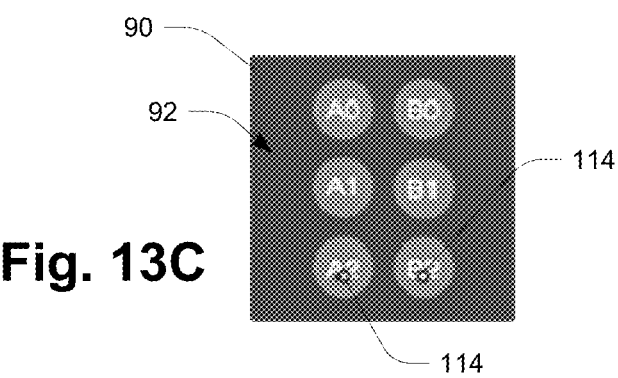

FIGS. 13A-13C illustrate an alternative scheme that employs cell configuration and movement according to a raster format, like that of FIGS. 11A-11F, but with two-beam interrogation as in the scheme of FIGS. 12A-12H. Each chamber 92 is moved into an optical beam path by the actuator 16 configured as an XY translational stage (or, in another embodiment, the beams may be moved across stationary chamber positions). This method may introduce additional alignment and translation complexity, i.e. two settings (X and Y) instead of one (angle). Nevertheless, a raster format may provide more flexibility in the number and locations of each fluid region in the multi-chamber cell design. In the illustrated example the intersection points of the optical beams are represented by respective optical beam spots 114.

Using the scheme of FIGS. 13A-13C, multiple samples with multiple buffers can be tested. For example, measurements can be taken as follows: row0→row1→row2, and measurements obtained as follows:

A0 (buffer0)−B0 (buffer0), which provides power offset between the two beams.
A1 (sample1 in buffer1)−B1 (buffer1) to yield diffAU$_1$
A2 (sample2 in buffer2)−B2 (buffer2) to yield diffAU$_2$
. . .
A$_n$ (sample n in buffer n)−B$_n$ (buffer n) to yield diffAU$_n$ If all samples share the same buffer, then fluids can be arranged as follows (again assuming the sequence of row0→row1→row2:

Row 0 collects both A0 (buffer)) and B0 (buffer), which measures any power offset between the two optical beam paths.

Row 1 collects A1 (sample1 in buffer) and B1 (sample2 in buffer). B0 is subtracted from both to yield diffAU$_1$ and diffAU$_2$.

Row 2 collects A2 (sample3 in buffer) and B2 (sample4 in buffer). B0 is subtracted from both to yield diffAU$_3$ and diffAU$_4$
. . . etc.

The scheme of FIGS. 13A-13C could be extended to using more than two beams.

Figure 14A:
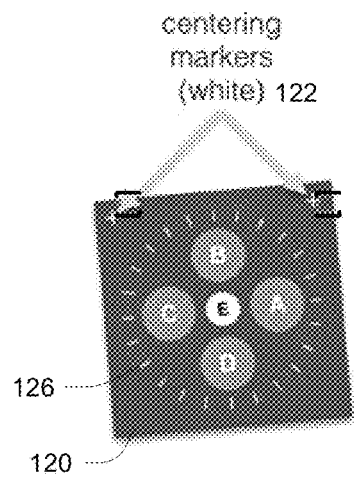
FIGS. 14A-14C are top views depicting use of first alignment features for both XY and angular alignment/centering of a cell.
Figure 14B:
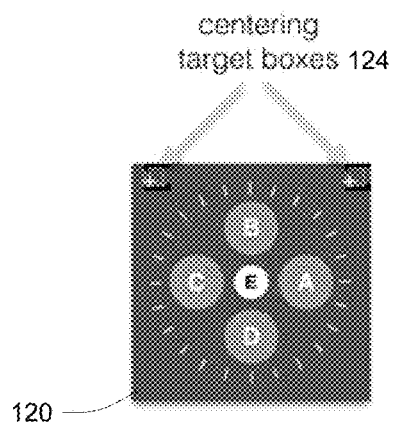
Figure 14C:
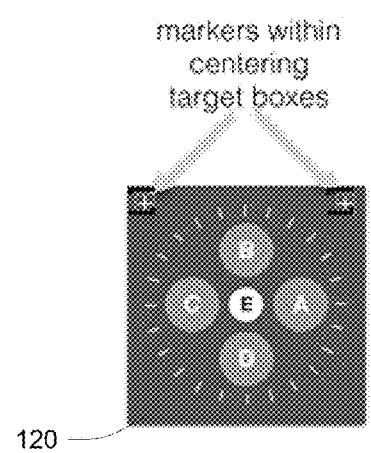

FIGS. 14A-14C depict a scheme for centering a cell 120 on a rotation mechanism, e.g., an electronically controlled rotational stage with a cell holder for mounting of the cell on the stage. Centering is facilitated first by the mechanical edges of the cell 120 which may be diced to better than ±10 um tolerance. Fine adjustment of cell centering can be performed by an electronically controlled XY stage, for example, to align target features on the cell to a target set in software.

FIG. 14A shows an initial, non-centered orientation of the cell 120 with non-zero angle and XY offsets. This is indicated by the relationship between centering markers 122 on the cell 120 and centering target boxes 124, which are part of an imaging system such as a visible camera. The markers 122 and boxes 124 are used to enable rotational (theta) alignment of the cell 120 to a "zero" starting angle position, which is illustrated in FIG. 14B. Once the rotation is properly set, XY adjustment is made to align the centering markers 122 inside their respective target boxes 124, as shown in FIG. 14C. Now the cell is properly centered, and rotation through the multiple fluid chambers will be repeatable and common.

FIGS. 14A-14C also show the use of additional features that may be useful in various embodiments. These include rotational position markers 126 disposed in a circular pattern as shown, which may be advantageous for stop-and-measure type measurements. The markers 126 may be etched patterns or deposited metal patterns and can be tracked by a camera or a laser-detector combination. There is also a calibration region, shown as "E", used for pathlength calibration. This calibration region may be realized in several way, including for example as an empty (air) cavity. Because anti-reflection coatings used on the inside surfaces of (silicon) windows are typically designed for aqueous solutions, air in the cell will lead to index mismatch and the appearance of etalons in spectral profile measurements of the calibration region E. Etalon formation is deliberate and used to determine the pathlength of the fluid regions in the cell 120. This can be done, for example, by sweeping a tunable laser through a spectral region of interest. Placement of region E can be anywhere on the cell 120 reachable by the optical beam. A single calibration region E is located at the center of the cell 120 in this example, but alternative embodiments may use multiple calibration regions placed between regions A-D, for example. Measurement of region E could be performed by moving the cell 120 so that the optical beam path passes through region E. Measurement of region E can be performed at any time prior to, during, or after measurement of the other regions A-D.

Figure 15:
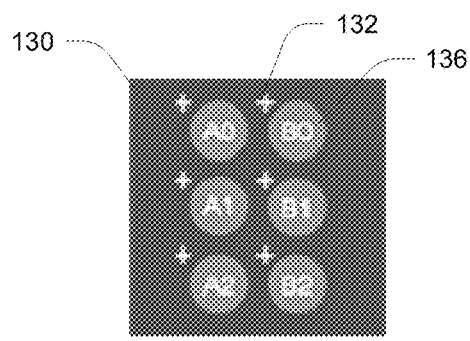
FIGS. 15-17 are top views depicting use of second alignment features for alignment of a cell.
Figure 16:
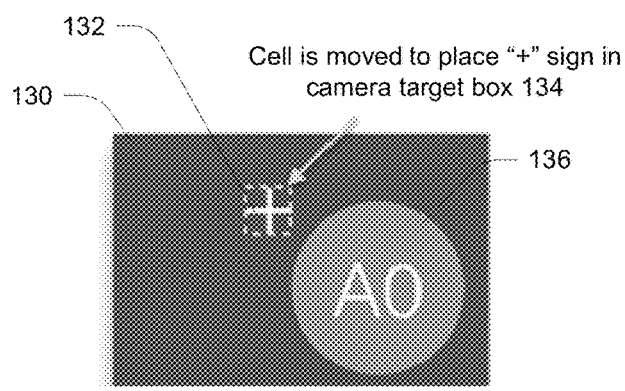
Figure 17:
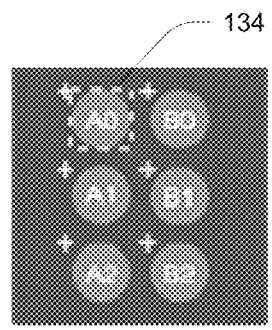

FIGS. 15-17 illustrate a cell 130 employing alignment marks 132 (shown as "+" signs) to facilitate repeatability of mechanical translation and targeting. One or more alignment marks 132 placed on the cell surface can be aligned with camera image target box 134 (FIG. 16), which can be factory set, to ensure good repeatability of beam alignment to each chamber 136. Tolerances of better than 10 um may be achieved. This can also be performed with assistance from a visible light laser (e.g. HeNe @ 632 nm). With each mechanical movement, the ability to provide closed-loop feedback of alignment of each region to the optical beam may be important for coherent systems and translation systems that can exhibit backlash, i.e. errors in mechanical positioning. The use of alignment marks 132 on the surface (e.g. metal pattern or etched pattern), which are registered during fabrication to the chambers 136, may be necessary because the materials used as the windows of the cell may not be transparent and the exact location of the fluid regions would not be discernable (e.g. silicon windows). Motion and motion correction may also be performed with the same optical beam as used to characterize fluid, and the cell may include a chamber, optical pass through or other feature for this purpose in a similar manner as described for other motion and position sensing technique. An additional detector may be used to generate a signal from the interaction of the optical beam an alignment feature or rotation markers, which may include reflection from, or transmittance through, the alignment feature or rotational markers.

Because the fluid cell may be manufacturable using MEMS semiconductor fabrication techniques, mechanical tolerances of the position of the chambers 82 relative to the edge of each cell of <5 um may be achieved. In one embodiment, mechanical alignment of the fluid cell to the adapter 16 may be used to achieve alignment between optical beam and fluid chamber when alignment markers are placed on the actuator 16 rather than the on the fluid cell. This has the advantage of reducing fluid cell size.

FIG. 16 shows an example in which the camera image is zoomed into one region (e.g. "A0"). The cell can be positioned so that the alignment mark lands within the camera target box 134. This yields very high mechanical resolution because the critical dimension (CD) of the alignment marks can be 10 um or less. If coarse alignment is sufficient and the boundaries of the fluid regions are discernable, then the camera target box 134 can be positioned over the entire region (e.g. "A0") as shown in FIG. 17.

Figure 18:
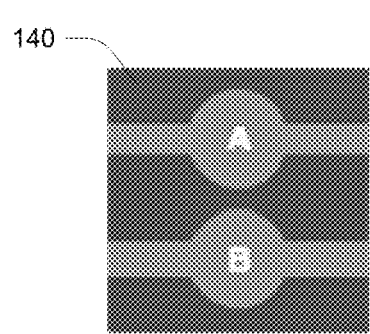
FIGS. 18-20 are top views showing two channel configurations with outer portions to accommodate fluid overflow.
Figure 19:
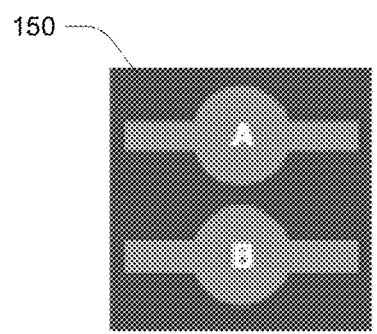
Figure 20:
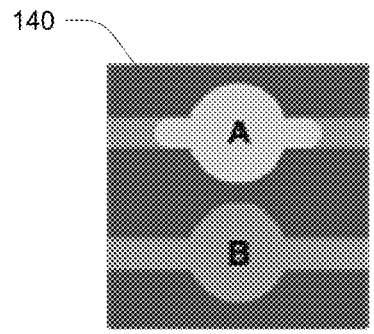

FIGS. 18-20 illustrate aspects of dispensing nanoliter and microliter fluid volumes into/onto a cell. For low sample volume applications, non-flow-type and single use cells have an advantage over flow cells. However, with non-flow cells it is necessary to place the fluid into the optical interrogation region. For cell designs without ports or pneumatic connections, fluid cannot be pushed into the optical interrogation region(s). Thus, for these types of designs, an open cell is required. At minimum, a top window is separated from a bottom window which may contain the geometries (e.g. wells and channels) for fluid confinement. This allows the fluids of interest to be dispensed directly into the interrogation regions (e.g. "A" and "B" in these Figures). Once the fluids are place on the bottom window, the top window is placed on top, forming a seal, typically by applying some pressure. The top window may be integrated into the instrument itself so that it is cleaned and reused for multiple measurements. In such an approach, only the bottom window is "disposed" after use. Reuse of the top window has the benefit of reducing the disposable cell cost.

FIGS. 18-20 each show regions A and B, having volumes of 80 nL each in one example. FIG. 18 shows open channels, i.e., extending to the edges of the cell 140. FIG. 19 shows closed channels, i.e., that do not extend to the edges of the cell 150. A small volume, e.g. 100 nL, is dispensed into the central round "well" regions, which may be approximately 25 um deep and 2 mm in diameter in one example. This volume corresponds with a hemispherical droplet of radius 363 um. Surface tension and channel design keeps liquid in place. Placement of a top window over the channels will compress the fluid, and 20 nL excess fluid flows into channels. For the open-channel cell 140, air is permitted to escape through the open channels. Surface tension will keep the fluid in the channel. For closed channels, trapped air will compress at the ends of the channel, outside of the measurement region. Overflow channels may have, for example, dimensions of 4 mm×1 mm×25 um which would accommodate an additional 100 nL of excess fluid. Therefore, if dispensed fluid is 100 nL±20 nL, then the fluid is contained within the cell.

Generally, fluid can be injected into a closed cell, for example, by a pipette that forms a seal to an open channel port (e.g. on cell edge). It can then push a known fluid volume into the region where it can later be measured. No fluid flow or modulation during or between measurements is necessary.

Figures 21A, 21B, 21C:
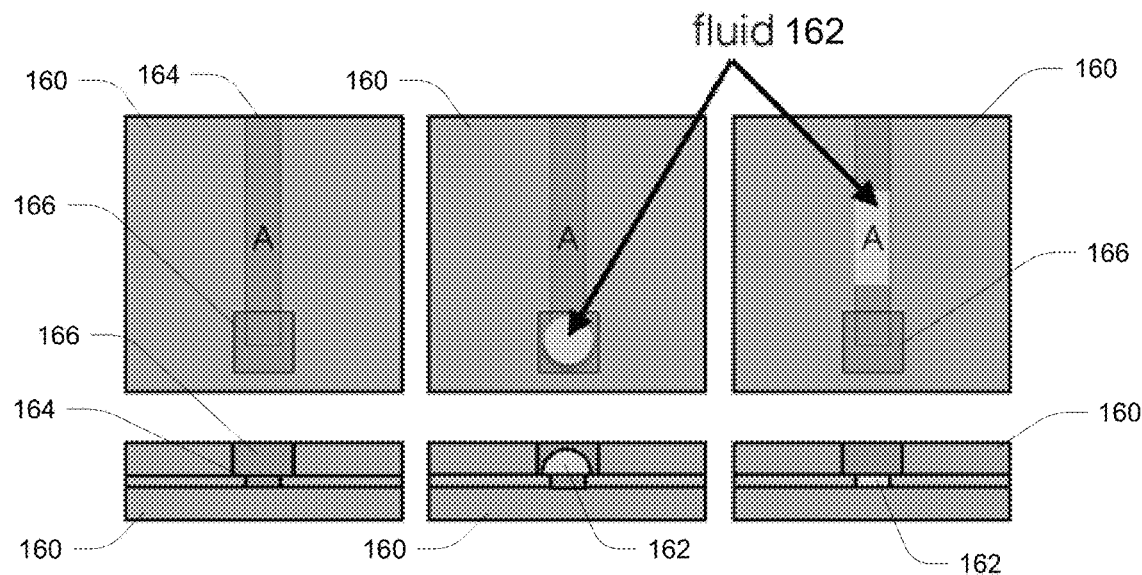
FIGS. 21A-21C are diagrams depicting a cell with integrated fluid reservoir.

FIGS. 21A-21C illustrate a cell 160 in which fluid 162 is forced into a closed chamber 164 from an integrated fluid reservoir 166, for example by forming a pressure gradient along the channel (e.g. vacuum or low-pressure condition on one port and atmospheric or high-pressure condition on the other connected open port). Each of FIGS. 21A-21C includes both a top view (upper) and end view (lower). FIG. 21A shows an empty reservoir, integrated into the top window of the (sealed) cell 160. FIG. 21B shows a 1 uL droplet of fluid 162 dispensed into the reservoir 166, which covers the opening to the measurement channel 164. Fluid volumes may of course be larger or smaller than 1 uL. FIG. 21C shows the droplet of fluid 162 as it is forced into the channel 162 by a pressure gradient between the reservoir opening and the exit port. Because the droplet volume is known when dispensed and the measurement channel geometry is known by design, a volume displacement mechanism like a syringe pump can be used to move the fluid droplet a known distance in the measurement channel, moving it into position for optical measurement described in methods above. Thereafter, the channel may be sealed to prevent further motion of the fluid in the channel.

Figure 22:
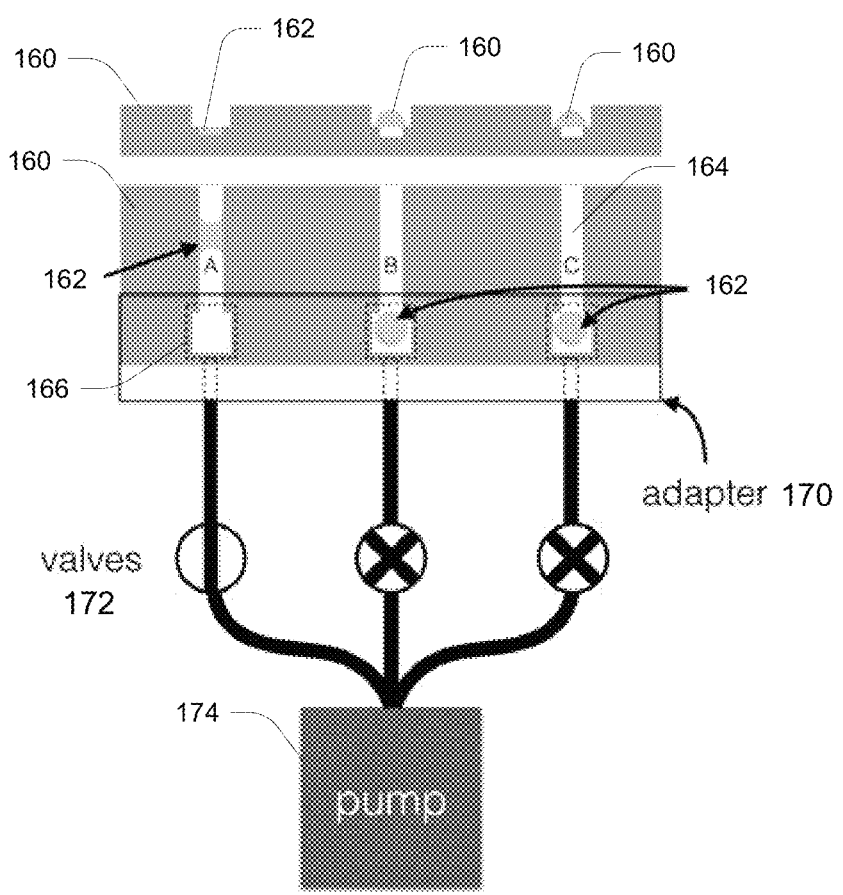
FIG. 22 is a schematic diagram showing use of a fluid adapter with the cell of FIGS. 21A-21C.
Figure 23:
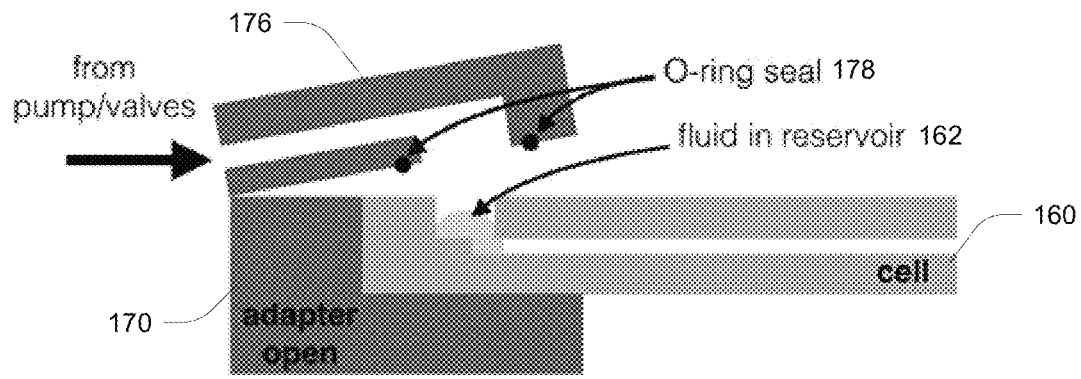
FIGS. 23-24 are side views illustrating details of the fluid adapter and its connection to the cell.
Figure 24:
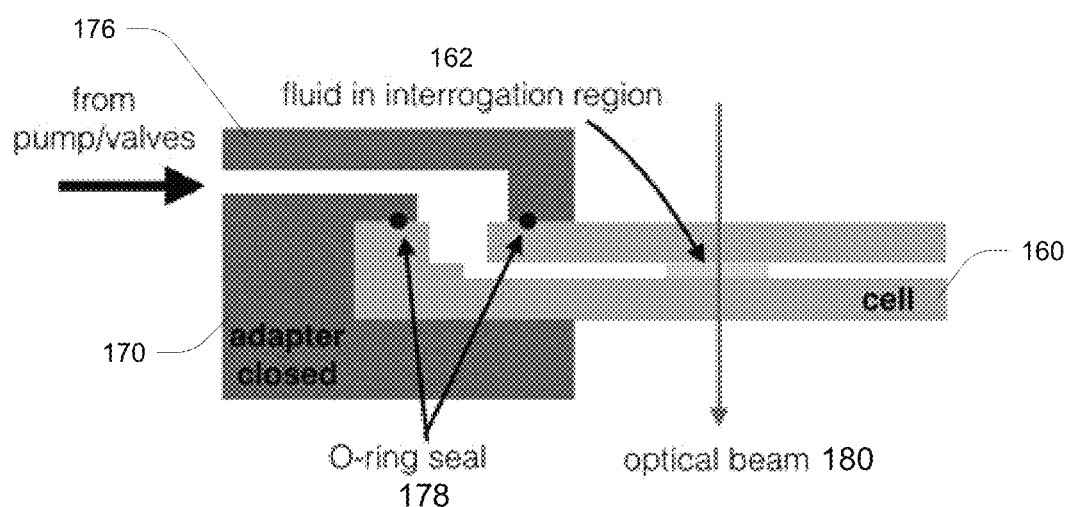

FIGS. 22-24 illustrate an adapter 170 that can be mated to a reservoir-type of cell 160 such as described above. Pressure can be directed to any of the reservoirs 166 by opening valves 172 to the respective cells. In FIG. 22, the left-most valve 172 is open and the positive pressure from the pump 174 moves the droplet from the reservoir 166 to the interrogation region within channel A. The other two valves 172 are closed. Once the fluid 162 is in position, the first valve 172 may be closed. A similar process can then be applied to the other two valves 172. This scheme may of course be used with cells having other than three chambers/channels 164.

FIG. 23 is a side view showing the adapter 170 open before sealing to the cell 160 (and showing fluid in the reservoir 162 as it would appear after sealing the adapter to the cell). An upper part 176 of adapter 170 has O-ring seals 178 to provide a fluid seal between the adapter 170 and cell 160.

FIG. 24 is a side view showing the adapter 170 closed and sealed to the cell 160, after pressure has been applied, moving the droplet of fluid 162 down the channel 164 into the interrogation region (example optical beam 180 also shown).

An adapter such as adapter 170 could be made of metal or plastic, for example. It would need sufficient structural rigidity to provide a good pressure seal to the cell 160. O-ring seals 178 may be used to provide sealed contact between the adapter 170 and the cell 160. In the illustrated embodiment, the upper part 176 of the adapter 170 is shown as a hinge which clamps down on the cell 160, forming a pressure seal. Alternatively, the upper part 176 could be attached in other ways, such as secured by clamps or screws, for example. Adhesive attachments may be added to the surface of the cell 160. Attachments may be threaded or may interface with ferrules in standard connector types.

Pathlength Offset Strategies

Several techniques are described for reducing and/or otherwise addressing differences unknown variability of optical path lengths to improve measurement accuracy.

Controlled Pathlength Difference within Each Interrogation Region (Aka Multipath Multi-Cell)

Consider a cell which is opened and closed where there may be material (e.g. fluid) at the closure interface, which adds uncertainty to the exact pathlength of the cell. In such a system where the pathlength in a cell is unknown or uncontrolled, a precise determination of the absorbance of the medium inside the cell (e.g. fluid in cell) may not be possible without the use of a reference. However, it is possible to create two or more different pathlengths within the transmission cell where the pathlength differences are known.

Figure 25:
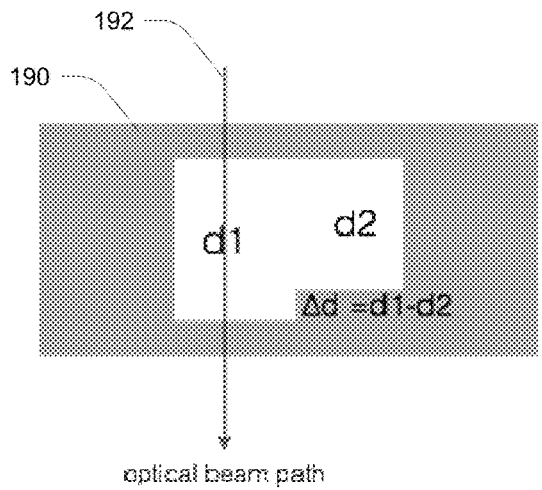
FIGS. 25-26 are top schematic views illustrating a cell with multiple pathlengths.
Figure 26:
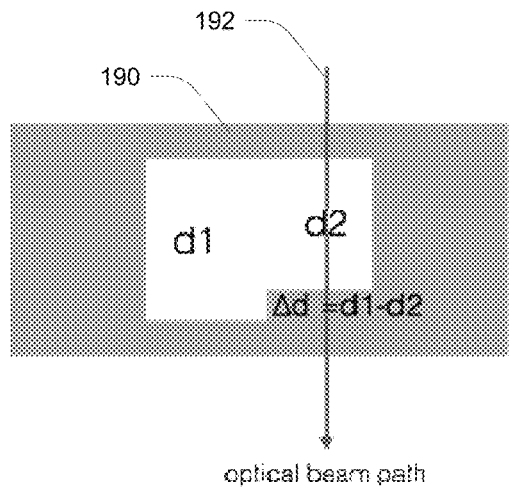

FIGS. 25-26 are cell cross-sections illustrating a configuration employing such a technique. It is assumed that two measurements are being taken (e.g. by moving the cell 190 across a static optical beam 192), and that pathlength d1 is not known to a desired degree of accuracy. A second pathlength d2 is created such that their difference $\Delta d = d1 - d2$ is known to the desired accuracy. For example, if both pathlengths d1 and d2 are defined by the thickness of a single fabricated spacer, then the fabrication process may provide for very tight tolerance of $\Delta d$ even if only some wider tolerance is provided for d1 or d2. With $\Delta d$ being known, a precise determination of the absolute absorbance of the fluid in the cell can be performed. This is advantageous because a known pathlength difference can be used to determine the absolute absorbance coefficient alpha, since $AU = 10^{(-alpha*d)}$ where d=pathlength. So, performing signal measurements for the two pathlengths d1, d2 will yield a ratio between two measurements $AU1/AU2 = 10^{(-alpha*\Delta d)}$, where $\Delta d = d1 - d2$, and so the absorbance coefficient alpha can be determined absolutely because AU1, AU2 and $\Delta d$ are all measurable. This avoids the problem of having the same pathlength for all interrogation regions or measuring their differences between pathlengths with a common fluid (air or liquid).

Here, a known pathlength difference is deliberately created (e.g. by micromachining) into the interrogation region using various techniques, including but not limited to deep reactive ion etching (DRIE) and wet-etching. Additionally, silicon-on-insulator starting materials can be used to facilitate control of the etch process. An example of a fabrication sequence that could be used to create such a cell is as follows:

Top window:
Deposit AR coatings on silicon wafer ("flat window")
Dice wafer
Bottom window: needs at least two etch depths with known etch depth difference
Deposit and then pattern a metal or dielectric (etch) hardmask on silicon wafer
Spin-coat photoresist with a slightly smaller mask pattern.
Perform etch (e.g. DRIE) primarily using the photoresist mask.
After etching a known/controlled etch depth, strip the photoresist. This exposes the metal or dielectric hardmask.
Continue with DRIE (etch). Two etch depths (pathlengths) are now created in the same cell/channel.
Strip the hardmask, deposit AR coating.
Dice the bottom window (complete)

Multiple pathlengths can also be used to manage the signal dynamic range of the detector, helping to keep the transmitted signal within the linear range of the detector. For example, consider that for low concentration protein analytes (e.g. 1 mg/ml HEWL), the buffer (water) absorbance dominates, which is approximately AU=2.7 at 22 um pathlength, or approximately 0.123 AU/um. Therefore a 50% decrease in transmission requires an increase in pathlength of approximately (0.3 AU)/(0.123 AU/um)=2.44 um. A factor of 10 reduction (OD 1.0) would require a decrease of (1.0 AU)/(0.123 AU/um)=8.1 um. In this way, a cell with multiple pathlengths can replace the need for separate neutral density filters used to manage the optical signal power reaching the detector. Often these additional discrete optics introduce unwanted artifacts like etalons that can lead to repeatability problems in measurements.

Modulating the Pathlength

A cell with a known adjustable pathlength may have similar advantages but achieve them through on-axis positioning that provides modulation of the pathlength. Pathlength modulation may be relatively rapid (e.g. >10 Hz), allowing the analyzer to measure the laser signal at lower 1/f noise, thereby improving system sensitivity and performance. AC detectors such as pyroelectric detectors can also be used.

Figure 27:
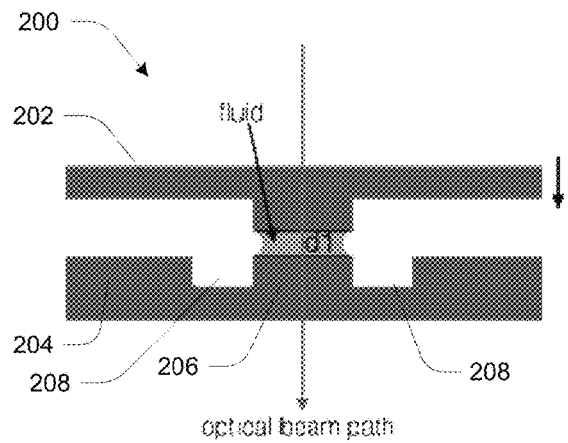
FIGS. 27-28 are side schematic views illustrating a cell with adjustable pathlength(s)
Figure 28:
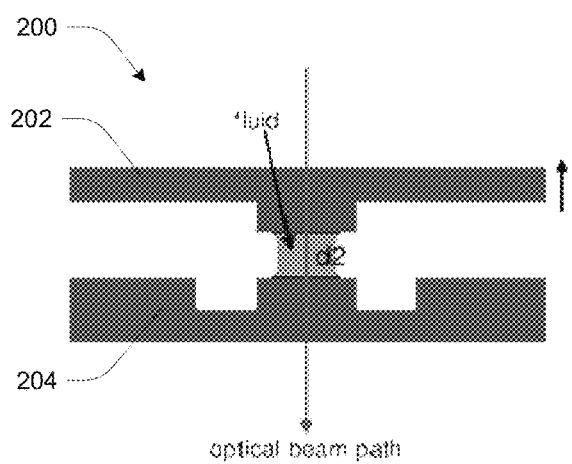
Figure 29:
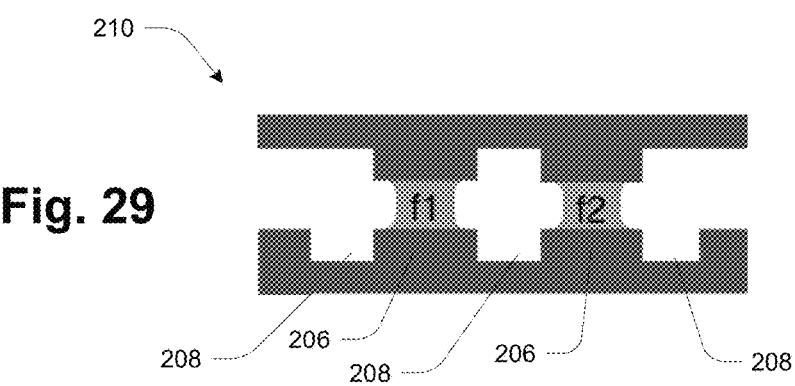
FIG. 29 is a side schematic view illustrating a two-chamber cell.

FIGS. 27-29 show side views of cells 200, 210 having adjustable (modulated) cell pathlengths. FIG. 27 shows a first pathlength d1 for cell 200, created by maintaining a corresponding first spacing between a top window 202 and bottom window 204. FIG. 28 shows a longer pathlength d2 for cell 200, created by maintaining a corresponding larger spacing. Fluid may be held in place by surface tension and by window surface treatment to promote hydrophilic behavior on a pedestal 206. On either side of the central fluid pedestal 206 are moats 208 that can capture excess fluid. This may be important in multi-sample cells where different fluid samples may be in close proximity to one another. The moats 208 can prevent cross-contamination between different fluids (e.g. f1 and f2) placed on multiple pedestals 206 in a cell, such as in the two-chamber cell 210 illustrated in FIG. 29. Moats 208 can be created using semiconductor fabrication techniques (such as wet etching or plasma etching) when the cell is glass or a semiconductor material such as silicon. A photoresist mask or hardmask may be used to protect the "pedestal" regions while exposing the moat regions to the etchant. In other cases, the moat regions 208 could be machined or laser-scribed. The pedestal 206 should be protected during fabrication as it is important for the window in the optical beam path to remain specularly/optically smooth and free of defects in order to achieve good sensitivity and reproducibility during optical absorbance measurements. Motion can be achieved by any number of techniques as known in the art, including MEMS and piezoelectric actuators.

Beam diameter (~200 um) is typically much smaller than pedestal diameter (~2 mm). Though possible, the fluid is not required to be a waveguide for the optical beam. Peak transmission through 1 mg/ml HEWL in water, at 22 um pathlength through 26 um pathlength. A 26 um pathlength has about half the transmission of 23.5 um pathlength. Signal attenuation is 0.123 AU/um where absorbance is dominated by the buffer (water), and so, as expected, 2.5 um additional pathlength reduces signal transmission by 50%.

FIGS. 30-32 illustrate a cell 220 in which two fluids f1, f2 are placed in wells 222, with excess fluids being pushed out by displacing pistons 224. FIG. 30 shows the two fluids f1 and f2 in the two separate wells 222, separated by an overflow moat 226. The top window is characterized by two pistons 224 that displace the fluids. There may also be a port/vent (not shown) that allows trapped air to escape. Air bubbles in the interrogation region are to be avoided because they can corrupt the measured signal. FIG. 31 shows the pistons 224 lowered to the desired pathlength, displacing each fluid. Any excess fluid spills over into the overflow moat 226 which prevents cross-contamination between fluids. The top and bottom windows may be treated with an anti-reflection (AR) coating to reduce etalon behavior in the fluid cavity.

FIG. 32 shows the optical beam path(s) 228 through the chambers. In a dual beam system, there are two paths as shown. In a single beam system, the cell or beam is moved to into a position such that the optical beam passes through the fluid of interest. Wells 222 and pistons 224 can be fabricated using various methods including but not limited to chemical etching, plasma etching, laser drilling, bonding of multiple patterned wafers. When the cell material is silicon, for example, DRIE may be used to achieve the desired high aspect ratio characteristic of wells and pistons. Wet etch methods such as KOH may also be used. Additionally, by using silicon as the cell material, the use of standard semiconductor fabrication tools and processes would be highly advantageous (if not necessary) to achieve the desired dimensional (depth) tolerances across a multi-cell chip and the size reduction needed for low-cost disposable cells.

Variable Attenuator Cell

One difficulty in making spectroscopic measurements in fluids is the very wide range of absorbance that may be encountered over the spectral range of interest. A wide dynamic range challenges the detector technology used to measure the optical signals, or may require variable optical sources. One method of limiting the dynamic range requirement of the detector is to provide a fluidic cell with variable attenuation.

FIG. 33 shows such a variable-attenuation cell 230. It may be constructed with two fluids in the optical path: one fluid 232 being the sample under test, and the second fluid being an attenuator 234. The attenuator fluid 234 may be selected such that at two or more wavelengths of interest, the variance of the transmitted power of an optical beam 236 through the cell 230 may be less than that for the sample fluid 232 alone. One or more attenuator fluids 234 may be used in sequence (i.e. one per wavelength), with the fluid selected to reduce transmission variability. An attenuation fluid 234 (which may contain one or more analytes or absorbing materials) may also be selected for its absorbance properties being the complement of the sample fluid absorbance, i.e., at a wavelength where the sample fluid 232 has increased absorbance, the attenuator fluid 234 has reduced absorbance. The attenuator fluid 234 may be placed into the cell (e.g., by flowing) and flushed and replaced as needed.

Hydrophilic/Hydrophobic Surfaces

In the cells described herein, thin film coatings or surface treatments that are hydrophilic can be placed on the fluid-side windows of the interrogation region. This promotes the localization of the analyte droplet in the correct position within the interrogation region. Conversely, hydrophobic coatings or surface treatments can be placed/applied in the cell regions where fluid is intended to be repelled or to be moved (e.g. form reservoir to interrogation region).

While the techniques and embodiments disclosed herein frequently use proteins, protein buffers and water, other analytes and fluids may also be used. Various combinations of the embodiments and methods described herein may be used in other embodiments containing one or more elements of each of the underlying embodiments. It will be understood by those skilled in the art that various changes in form and details may be made without departing from the scope of the invention as defined by the appended claims.

What is claimed is:

1. A microfluidic analyzer, comprising:
a set of optical sources and a set of optical detectors, the optical sources generating a set of optical beams, each optical beam defining a respective beam path along a respective beam axis;
a multi-chamber fluid cell disposed on the beam axes between the optical sources and optical detectors, the fluid cell having fluid chambers containing fluids, the fluid cell being mounted for movement relative to the optical beams to selectively align fluid chambers of the fluid cell with corresponding beam paths for obtaining optical-response measurements of fluids therein with reduction of a differential optical-response measurement between fluid chambers not attributed to a differential analyte in chamber fluids;
an actuator configured and operative to apply the movement of the fluid cell in response to actuator control signals; and
a controller configured and operative (1) to generate the actuator control signals to produce the movement of the fluid cell through a sequence of measurement positions in which corresponding fluid chambers of the fluid cell are aligned with corresponding beam paths, the sequence of measurement positions including multiple repetitions of respective individual measurement positions for the respective fluid chambers, (2) for each measurement position, to obtain a respective set of detector output values from the optical detectors, and (3) to apply processing to the sets of detector output values for the sequence of measurement positions to obtain an analyte optical-response measurement for characterizing a differential analyte between chamber fluids of the fluid cell.

2. The microfluidic analyzer of claim 1, wherein the actuator is configured for translational movement of the fluid cell through the sequence of measurement positions.

3. The microfluidic analyzer of claim 2, wherein the fluid chambers of the fluid cell are disposed in a grid fashion and the actuator is configured for raster movement of the fluid cell through the sequence of measurement positions.

4. The microfluidic analyzer of claim 3, wherein the measurement positions are first measurement positions, and wherein the actuator and controller are co-configured and operative to also provide movement through second measurement positions in which the fluid chambers are not aligned with the beam paths to obtain corresponding dark offset measurements.

5. The microfluidic analyzer of claim 3, wherein the fluid cell includes alignment features, and further including an imaging system with an alignment reference indicating correct alignment of the fluid cell to the optical beam axis when the visible alignment features of the fluid cell are in registration with the alignment reference.

6. The microfluidic analyzer of claim 3, wherein the fluid cell includes integrated fluid reservoirs for accepting dispensed fluids of a first volume and providing a second smaller volume of the fluids to the respective chambers.

7. The microfluidic analyzer of claim 3, wherein surfaces of a fluid chamber in the beam path are coated to reduce optical reflections in the chamber when containing fluids and increase optical reflections in the chamber when not containing fluids.

8. The microfluidic analyzer of claim 3, wherein the fluid cell is configured with multiple pathlengths per fluid chamber to provide for reducing pathlength differences in the optical-response measurements, and wherein each fluid chamber includes a step-like transition in the fluid chamber to define the multiple pathlengths.

9. The microfluidic analyzer of claim 3, wherein the fluid cell includes a bottom member and a top member, the bottom member defining respective wells for the fluid chambers, the top member defining respective pistons extending into the wells, the pistons displacing fluid from the fluid chambers during preparation of the fluid cell for use.

10. The microfluidic analyzer of claim 1, wherein the measurement positions are first measurement positions, and wherein the actuator and controller are co-configured and operative to also provide movement through second measurement positions in which the fluid chambers are not aligned with the beam paths to obtain corresponding dark offset measurements.

11. The microfluidic analyzer of claim 10, wherein the set of optical beams define respective beam paths through which the fluid chambers are moved for obtaining the optical-response measurements, the beam paths extending through respective distinct fluid chambers of the fluid cell in each of the measurement positions.

12. The microfluidic analyzer of claim 11, wherein the differential optical-response measurement results from a difference in pathlength in the beam path within the chambers fluids.

13. The microfluidic analyzer of claim 12, wherein surfaces of a fluid chamber in the beam path are coated to reduce optical reflections in the chamber when containing fluids and increase optical reflections in the chamber when not containing fluids.

14. The microfluidic analyzer of claim 13, wherein the fluid cell is configured with multiple pathlengths per fluid chamber to provide for reducing pathlength differences in the optical-response measurements.

15. The microfluidic analyzer of claim 14, wherein the fluid cell includes alignment features, and further including an imaging system with an alignment reference indicating correct alignment of the fluid cell to the optical beam axis when the alignment features of the fluid cell are in registration with the alignment reference.

16. The microfluidic analyzer of claim 15, wherein the optical beams have different power levels in respective fluid chambers, wherein a first beam power provides an improved differential optical-response measurement in a first set of fluid chambers relative to the differential optical-response measurement achievable with a second beam power, and the second beam power provides an improved differential optical-response measurement in a second set of fluid chambers relative to the differential optical-response measurement achievable with the first beam power.

17. The microfluidic analyzer of claim 16, wherein the fluid cell is a variable attenuator cell including a fluid attenuator channel along the beam axis, the fluid attenuator channel providing optical signal attenuation to match a receiving characteristic of the optical detector.

\* \* \* \* \*

UNITED STATES PATENT AND TRADEMARK OFFICE
CERTIFICATE OF CORRECTION

Page 1 of 1

PATENT NO. : 11,150,180 B1
APPLICATION NO. : 16/248045
DATED : October 19, 2021
INVENTOR(S) : Eugene Yi-Shan Ma et al.

It is certified that error appears in the above-identified patent and that said Letters Patent is hereby corrected as shown below:

In the Claims

Column 21, Claim 10, Line 16, insert --relative-- between "to also provide" and "movement through second".

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*